United States Patent [19]
Sheehan et al.

[11] Patent Number: 5,858,890
[45] Date of Patent: *Jan. 12, 1999

[54] LAMINAR FIBROUS STRUCTURE HAVING Z-FIBERS THAT PENETRATE A CONSTANT NUMBER OF LAYERS

[75] Inventors: Philip William Sheehan, Oldsmar, Fla.; Ronnie Sze-Heng Liew, Pueblo, Colo.

[73] Assignee: The B. F. Goodrich Company, Richfield, Ohio

[*] Notice: This patent issued on a continued prosecution application filed under 37 CFR 1.53(d), and is subject to the twenty year patent term provisions of 35 U.S.C. 154(a)(2).

[21] Appl. No.: 850,879

[22] Filed: May 2, 1997

Related U.S. Application Data

[63] Continuation of Ser. No. 538,933, Oct. 4, 1995, abandoned, which is a continuation-in-part of Ser. No. 279,608, Jul. 25, 1994, Pat. No. 5,515,585.

[51] Int. Cl.$^6$ ........................................... B32B 5/06
[52] U.S. Cl. ........................ 442/392; 428/408; 428/902; 442/388
[58] Field of Search ..................... 428/408, 902; 442/388, 392

[56] References Cited

U.S. PATENT DOCUMENTS

| | | | |
|---|---|---|---|
| 2,930,100 | 3/1960 | Rust, Jr. | 28/4 |
| 3,090,101 | 5/1963 | Chagnon et al. | 28/72.2 |
| 3,657,061 | 4/1972 | Carlson et al. | 161/81 |
| 3,772,115 | 11/1973 | Carlson et al. | 156/148 |
| 3,994,762 | 11/1976 | Wrzeslen et al. | 156/178 |
| 4,284,680 | 8/1981 | Awano et al. | 428/234 |
| 4,621,662 | 11/1986 | Olry | 138/129 |
| 4,780,363 | 10/1988 | Evans et al. | 428/300 |
| 4,790,052 | 12/1988 | Olry | 28/110 |
| 4,955,123 | 9/1990 | Lawton et al. | 29/419.1 |
| 5,081,754 | 1/1992 | Lawton et al. | 29/419.1 |

(List continued on next page.)

FOREIGN PATENT DOCUMENTS

| | | | |
|---|---|---|---|
| 0530741A1 | 10/1993 | European Pat. Off. | D04H 1/42 |
| 2626294 | 1/1988 | France | D04H 1/46 |
| 1308999 | 7/1973 | United Kingdom | D04H 18/00 |
| 1549687 | 1/1979 | United Kingdom | C01B 31/00 |
| 2012671 | 1/1979 | United Kingdom | B32B 5/06 |
| 2230491 | 10/1990 | United Kingdom | B32B 5/02 |
| 2099365 | 6/1994 | United Kingdom | . |
| 2271155 | 6/1994 | United Kingdom | F16D 65/12 |

(List continued on next page.)

OTHER PUBLICATIONS

United Kingdom; Request for Grant of a Patent No. 8602003; Jan. 28, 1986; Applicant/Agents Reference: DAL/ST.B.488; Title: "A Carbonisable Fibre Assembly"; Inventors: Peter Geoffrey Lawton and Norman Smith; Country: England.

A Study of Needled Fabrics, Part I: Experimental Methods and Properties, by J.W.S. Hearle, M.A.I. Sulton, Journal of the Textile Institute, vol. 58, 1967, pp. 251–265.

A Study of Needled Fabrics, Part II: Effects of the Needling Process, by J.W.S. Hearle, M.A.I. Sultan, and T.N. Choudhari, Journal of the Textile Institute, vol. 103, 1968, pp. 102–116.

(List continued on next page.)

*Primary Examiner*—James J. Bell
*Attorney, Agent, or Firm*—Kevin L. Leffel

[57] ABSTRACT

The invention relates to the field of forming fibrous structures. A fibrous structure according to the invention has an upper group of fibrous layers and lower group of fibrous layers subjacent the upper group of fibrous layers. A multitude of Z-fiber bundles cohere the fibrous layers, each fibrous layer within the upper group of fibrous layers having a portion of the multitude of Z-fiber bundles originating in that fibrous layer and passing through a number of fibrous layers disposed beneath that fibrous layer without passing through all of the fibrous layers disposed beneath that fibrous layer. The number of fibrous layers penetrated by the Z-fiber bundles is constant within the first portion.

7 Claims, 22 Drawing Sheets

U.S. PATENT DOCUMENTS

| | | | |
|---|---|---|---|
| 5,113,568 | 5/1992 | Lawton et al. | 29/419.1 |
| 5,184,387 | 2/1993 | Lawton et al. | 29/419.1 |
| 5,217,770 | 6/1993 | Morris, Jr. et al. | 428/36.3 |
| 5,226,217 | 7/1993 | Olry | 28/107 |
| 5,323,523 | 6/1994 | Lawton et al. | 29/419.1 |
| 5,388,320 | 2/1995 | Smith et al. | 29/419.1 |
| 5,390,217 | 2/1995 | Ioki et al. | 376/150 |
| 5,504,979 | 4/1996 | Sheehan et al. | 28/43 |
| 5,515,585 | 5/1996 | Sheehan et al. | 28/104 |
| 5,581,857 | 12/1996 | Sheehan et al. | 28/113 |
| 5,654,059 | 8/1997 | Hecht | 428/65.9 |

FOREIGN PATENT DOCUMENTS

| | | | |
|---|---|---|---|
| 9101397 | 7/1991 | WIPO | D04H 1/46 |
| 9204492 | 3/1992 | WIPO . | |
| 9612842 | 5/1996 | WIPO | D04H 18/00 |

OTHER PUBLICATIONS

A Study of Needle Fabrics, Part VII: The Transfer of Fibres Through The Web By Needling, by J.W.S. Hearle and T.N. Choudhari, Journal of the Textile Institute, vol. 60, 1969, pp. 478–496.

A Study of Needle Action During Needle–Punching, J.W.S. Hearle, A.T. Purdy, and J.T. Jones, Journal of The Textile Institute, vol. 64, 1973, pp. 617–623.

A Study of Needle Action During Needle–Punching, G.Barrett, Journal of The Textile Institute, vol. 65, 1974, p. 226.

A Study of Needle Action During Needle Punching, A.T. Purdy, Journal of The Textile Institute, vol. 65, 1974, p. 227.

Computer Assisted Quality Assurance On Needling Machines, 2N s.a.s. di Antonio Nancini, I–51100 Pistoia Italy, Readers Service No. 2–143, INB Nonwovens 1+2/92, p. 41.

Measure of Needle Punch Density In Dynamic State And Application To Process Control, T. Yokota, H. Takahashi, N. Kawafune, pp. 599–603.

Engineering Needle Punched Nonwovens To Meet Functional Properties, A.K. Rakshit, A.N. Desai & N. Balasubramanian, pp. 20–24.

A Study On The Properties Of Needle–Punched Non–Woven Fabrics Using Factorial Design Technique, V. Subramaniam, M. Madhusoothanan & C.R. Debnath, A.C. College, Madras, pp. 124–132.

Studies On The Needle Process: Influence Of Stick Density And Needle Penetration On Quality–Related Properties And Needle–Punching Effectiveness, Dr. rer. nat. Gunther Voigtlander, Research Institute for Textile Engineering, Chemnitz GmbH, Melliand Textilberichte, vol. 5, 1992, pp. 391–396. (Copy in German language, pp. 391–396, and translation to English Language, pp. 1–32).

A Contribution To The Determination Of Felting Needle Puncture Depth, A. Ptacek et al., Textilbetrieb, Jul./Aug. 1987, pp. 26–29, (Copy in German language, pp. 26–29, and English translation, pp. 1–17.).

| Needling Pass | Layer 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 100 | 100 | | | | | | | | | | | | |
| 2 | 100 | 100 | 100 | | | | | | | | | | | |
| 3 | 95 | 100 | 100 | 100 | | | | | | | | | | |
| 4 | 25 | 95 | 100 | 100 | 100 | | | | | | | | | |
| 5 | – | 25 | 95 | 100 | 100 | 100 | | | | | | | | |
| 6 | 0.6 | – | 70 | 95 | 100 | 100 | 100 | | | | | | | |
| 7 | 0.6 | – | – | 25 | 95 | 100 | 100 | 100 | | | | | | |
| 8 | | – | – | – | 25 | 95 | 100 | 100 | 100 | | | | | |
| 9 | | 0.2 | – | – | – | – | 70 | 100 | 100 | 100 | | | | |
| 10 | | | | 0.9 | – | – | – | 70 | 95 | 100 | 100 | | | |
| 11 | | | | | 0.8 | – | – | – | 70 | 95 | 100 | 100 | | |
| 12 | | | | | | 0.9 | – | – | – | 70 | 95 | 100 | 100 | |
| 13 | | | | | | | 0.3 | – | – | – | – | 70 | 95 | 100 |
| 14 | | | | | | | | 0.9 | – | – | – | 70 | 95 | 100 |
| 15 | | | | | | | | | 0.2 | – | – | – | – | 70 |
| 16 | | | | | | | | | | 0.4 | – | – | – | – |
| 17 | | | | | | | | | | | 0.3 | – | – | – |
| 18 | | | | | | | | | | | | 0.2 | – | – |
| 19 | | | | | | | | | | | | | 0.3 | – |
| 20 | | | | | | | | | | | | | | 0.2 |
| 21 | | | | | | | | | | | | | | |
| 22 | | | | | | | | | | | | | | |
| 23 | | | | | | | | | | | | | | |
| 24 | | | | | | | | | | | | | | |
| 25 | | | | | | | | | | | | | | |
| 26 | | | | | | | | | | | | | | |
| 27 | | | | | | | | | | | | | | |
| 28 | | | | | | | | | | | | | | |
| 29 | | | | | | | | | | | | | | |
| 30 | | | | | | | | | | | | | | |
| 31 | | | | | | | | | | | | | | |
| W01 | | | | | | | | | | | | | | |
| W02 | | | | | | | | | | | | | | |
| W03 | | | | | | | | | | | | | | |
| ACTUAL CQT | 320 | 420 | 465 | 420 | 420 | 395 | 370 | 370 | 365 | 365 | 295 | 340 | 290 | 270 |
| DESIRED CQT | 440 | 490 | 465 | 395 | 370 | 370 | 370 | 370 | 365 | 320 | 320 | 320 | 295 | 270 |

| | | | | | | | | LAYER NUMBER | | | | | | | | | |
|---|---|---|---|---|---|---|---|---|---|---|---|---|---|---|---|---|---|
| 15 | 16 | 17 | 18 | 19 | 20 | 21 | 22 | 23 | 24 | 25 | 26 | 27 | 28 | 29 | 30 | 31 | 32 |
| 100 | | | | | | | | | | | | | | | | | |
| 95 | 100 | | | | | | | | | | | | | | | | |
| 70 | 100 | 100 | | | | | | | | | | | | | | | |
| – | 70 | 100 | 100 | | | | | | | | | | | | | | |
| – | – | 70 | 95 | 100 | | | | | | | | | | | | | |
| – | – | – | 70 | 100 | 100 | | | | | | | | | | | | |
| – | – | – | – | 70 | 95 | 100 | | | | | | | | | | | |
| – | – | – | – | – | 70 | 95 | 100 | | | | | | | | | | |
| | | | 0.7 | – | – | – | 25 | 95 | 100 | | | | | | | | |
| | | | | 0.7 | – | – | – | 25 | 95 | 100 | | | | | | | |
| | | | | | 0.7 | – | – | – | 25 | 95 | 100 | | | | | | |
| | | | | | | – | – | – | 70 | 95 | 100 | | | | | | |
| | | | | | | 0.6 | – | – | – | 25 | 95 | 100 | WS=220 | | | | |
| | | | | | | | – | – | – | – | 70 | 95 | 100 | | | | |
| | | | | | | | 0.7 | – | – | – | 25 | 95 | 100 | | | | |
| | | | | | | | | 0.7 | – | – | – | 25 | 95 | 100 | | | |
| | | | | | | | | | 0.7 | – | – | – | 25 | 95 | 100 | | |
| | | | | | | | | | 0.7 | – | – | – | 25 | 95 | 100 | 100 | |
| | | | | | | | | | | 0.5 | – | – | – | 25 | | | 100 |
| 265 | 270 | 270 | 265 | 270 | 265 | 220 | 220 | 220 | 265 | 220 | 265 | 220 | 220 | 245 | 290 | 225 | 200 |
| 270 | 270 | 270 | 265 | 265 | 265 | 225 | 220 | 220 | 220 | 265 | 265 | 195 | 220 | 290 | 225 | 200 | 200 |

FIG–11B

| $\delta$ (MM) | $\delta^i - \delta^{i-1}$ (MM) | T (MM) | $t_{air}$ (MM) | $t_{ave}$ (MM) | F (MM) | ACTUAL $D1_1$ (MM) | DESIRED $D1_1$ (MM) |
|---|---|---|---|---|---|---|---|
| 0.0 | – | 8.38 | 5.84 | 2.54 | 2.0 | 14.62 | – |
| 0.2 | 0.2 | 9.65 | 4.83 | 2.41 | 1.0 | 14.69 | 16.96 |
| 1.5 | 1.3 | 9.91 | 4.32 | 1.86 | 1.0 | 13.65 | 15.80 |
| 2.0 | 0.5 | 11.18 | 3.56 | 1.91 | 1.0 | 14.42 | 15.01 |
| 3.8 | 1.8 | 12.07 | 3.56 | 1.70 | 1.0 | 13.51 | 14.53 |
| 4.9 | 1.1 | 13.34 | 3.56 | 1.63 | 1.0 | 13.68 | 14.11 |
| 6.8 | 1.9 | 14.61 | 3.56 | 1.58 | 1.0 | 13.05 | 13.41 |
| 8.4 | 1.6 | 16.00 | 3.56 | 1.56 | 0.9 | 12.74 | 13.03 |
| 9.9 | 1.5 | 17.27 | 3.56 | 1.52 | 0.9 | 12.51 | 12.80 |
| 11.6 | 1.7 | 18.42 | 3.30 | 1.51 | 0.9 | 11.96 | 12.33 |
| 13.2 | 1.6 | 19.56 | 3.30 | 1.48 | 0.9 | 11.50 | 11.87 |
| 14.6 | 1.4 | 21.34 | 3.30 | 1.50 | 0.9 | 11.88 | 11.58 |
| 16.6 | 2.0 | 21.97 | 3.30 | 1.44 | 0.9 | 10.51 | 11.38 |
| 17.4 | 0.8 | 24.00 | 3.30 | 1.48 | 0.9 | 11.74 | 11.15 |
| 19.7 | 2.3 | 25.02 | 3.30 | 1.45 | 0.9 | 10.46 | 10.92 |
| 21.0 | 1.3 | 26.54 | 3.30 | 1.45 | 0.9 | 10.68 | 10.61 |
| 22.5 | 1.5 | 27.94 | 3.30 | 1.45 | 0.9 | 10.58 | 10.63 |
| 24.0 | 1.5 | 29.34 | 3.30 | 1.45 | 0.9 | 10.48 | 10.53 |
| 25.4 | 1.4 | 30.99 | 3.30 | 1.46 | 0.9 | 10.73 | 10.53 |
| 27.2 | 1.8 | 32.51 | 3.30 | 1.46 | 0.9 | 10.45 | 10.39 |
| 28.9 | 1.7 | 34.04 | 3.30 | 1.46 | 0.9 | 10.28 | 10.21 |
| 30.8 | 1.9 | 35.56 | 3.30 | 1.47 | 0.9 | 9.90 | 9.84 |
| 32.4 | 1.6 | 37.08 | 3.30 | 1.47 | 0.9 | 9.82 | 9.77 |
| 33.9 | 1.5 | 38.61 | 3.30 | 1.47 | 0.9 | 9.85 | 9.79 |
| 35.1 | 1.2 | 40.51 | 3.30 | 1.49 | 0.9 | 10.55 | 10.12 |
| 37.0 | 1.9 | 41.66 | 3.30 | 1.48 | 0.9 | 9.80 | 10.14 |
| 38.2 | 1.2 | 43.43 | 3.30 | 1.49 | 0.9 | 10.37 | 10.08 |
| 39.9 | 1.7 | 44.70 | 3.30 | 1.48 | 0.9 | 9.94 | 10.16 |
| 41.3 | 1.4 | 46.10 | 3.30 | 1.48 | 0.9 | 9.94 | 10.02 |
| 43.0 | 1.7 | 47.75 | 3.30 | 1.48 | 0.9 | 9.89 | 9.72 |
| 44.6 | 1.6 | 50.81 | 3.10 | 1.48 | 2.6 | 13.05 | |
| 46.2 | 1.6 | 50.65 | 2.95 | 1.48 | 0.9 | 9.59 | |
| 47.8 | 1.6 | 49.93 | 2.18 | 1.48 | – | 6.37 | |
| 49.4 | 1.6 | 49.86 | 2.11 | 1.48 | – | 4.70 | |

FIG-11C

| | | LAYER NUMBER | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| NEEDLING PASS | 1 | 70 | 100 | | | | | | | | | | | |
| | 2 | 100 | 100 | 100 | | | | | | | | | | |
| | 3 | – | 70 | 100 | 100 | | | | | | | | | |
| | 4 | – | – | 70 | 100 | 100 | | | | | | | | |
| | 5 | 0.49 | – | – | 70 | 100 | 100 | | | | | | | |
| | 6 | | 0.66 | – | – | 70 | 100 | 100 | | | | | | |
| | 7 | | | 0.83 | – | – | 70 | 100 | 100 | | | | | |
| | 8 | | | | 0.80 | – | – | 100 | 95 | 100 | | | | |
| | 9 | | | | 0.12 | – | – | – | 70 | 100 | 100 | | | |
| | 10 | | | | | 0.18 | – | – | – | 70 | 100 | 100 | | |
| | 11 | | | | | | 0.09 | – | – | – | 70 | 95 | 100 | |
| | 12 | | | | | | | 0.53 | – | – | – | 70 | 100 | 100 |
| ACTUAL CQT | | 170 | 270 | 270 | 270 | 270 | 270 | 270 | 265 | 270 | 270 | 265 | 200 | 100 · · |
| DESIRED CQT | | 270 | 270 | 270 | 270 | 270 | 270 | 270 | 270 | 270 | 270 | 270 | 270 | 270 · · |

FIG–13A

| $\delta$ (MM) | $\delta^i - \delta^{i-1}$ (MM) | T (MM) | $t_{ave}$ (MM) | F (MM) | DESIRED $D3_1$ (MM) | ACTUAL $D3_1$ (MM) | DESIRED $D1_1$ (MM) | ACTUAL $D1_1$ (MM) |
|---|---|---|---|---|---|---|---|---|
| 0.0 | – | 6.48 | 3.24 | 0 | – | – | – | 11.12 |
| –1.2 | –1.2 | 7.87 | 2.62 | 0.9 | 9.12 | 9.37 | 15.60 | 14.61 |
| 3.0 | 4.2 | 8.89 | 2.72 | 0.9 | 7.80 | 7.00 | 13.04 | 11.93 |
| 4.7 | 1.7 | 10.92 | 2.18 | 0.9 | 7.50 | 7.40 | 11.94 | 11.76 |
| 6.6 | 1.9 | 12.70 | 2.12 | 0.9 | 7.50 | 7.40 | 11.86 | 11.64 |
| 8.2 | 1.6 | 13.97 | 2.00 | 0.9 | 8.00 | 7.31 | 12.24 | 11.31 |
| 9.8 | 1.6 | 15.75 | 1.97 | 0.9 | 7.75 | 7.54 | 11.75 | 11.48 |
| 11.6 | 1.8 | 17.02 | 1.89 | 0.9 | 7.75 | 7.18 | 11.69 | 10.96 |
| 12.7 | 1.1 | 18.42 | 1.84 | 0.9 | 8.00 | 7.58 | 11.78 | 11.26 |
| 14.3 | 1.6 | 19.94 | 1.81 | 0.9 | 7.80 | 7.56 | 11.48 | 11.18 |
| 15.9 | 1.6 | 21.08 | 1.76 | 0.9 | 7.80 | 7.20 | 11.42 | 10.72 |
| 16.9 | 1.0 | 22.86 | 1.76 | 0.9 | 8.00 | 7.98 | 11.52 | 11.50 |

FIG-13B

| NEEDLING PASS 2 | | | |
|---|---|---|---|
| LAYER | N | DESIRED QUANTITY | DEPTH (MM) |
| 3 | 1 | 100 | 3.24 |
| 2 | 2 | 100 | 3.24 |
| 1 | 3 | 100 | 9.12 |
| | | $D1_1^2$ | 15.60 |

FIG-14A

| NEEDLING PASS 3 | | | |
|---|---|---|---|
| LAYER | N | DESIRED QUANTITY | DEPTH (MM) |
| 4 | 1 | 100 | 2.62 |
| 3 | 2 | 100 | 2.62 |
| 2 | 3 | 70 | 7.80 |
| | | $D1_1^3$ | 13.04 |

FIG-14B

| NEEDLING PASS 4 | | | |
|---|---|---|---|
| LAYER | N | DESIRED QUANTITY | DEPTH (MM) |
| 5 | 1 | 100 | 2.22 |
| 4 | 2 | 100 | 2.22 |
| 3 | 3 | 70 | 7.50 |
| | | $D1_1^4$ | 11.94 |

FIG-14C

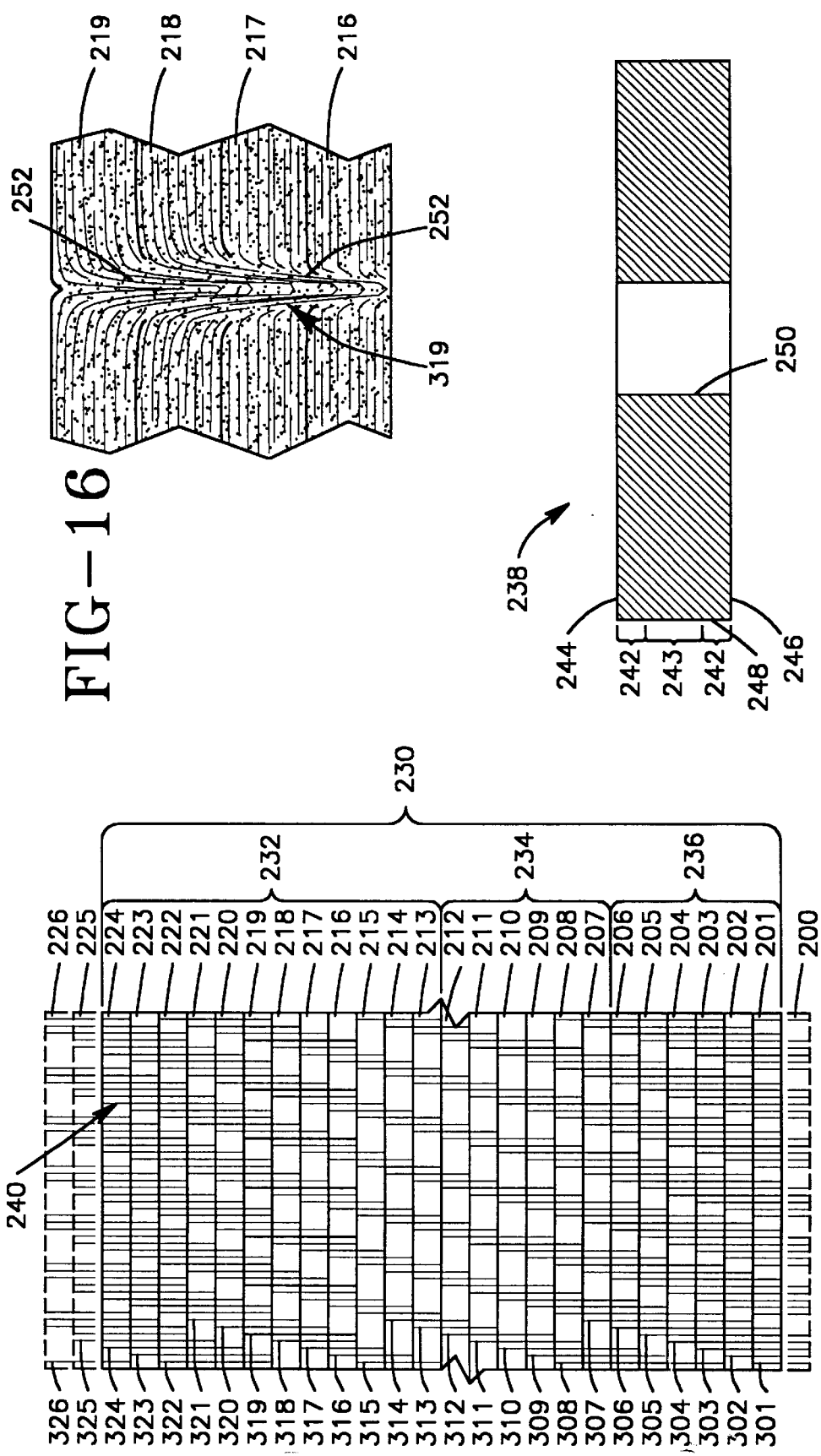

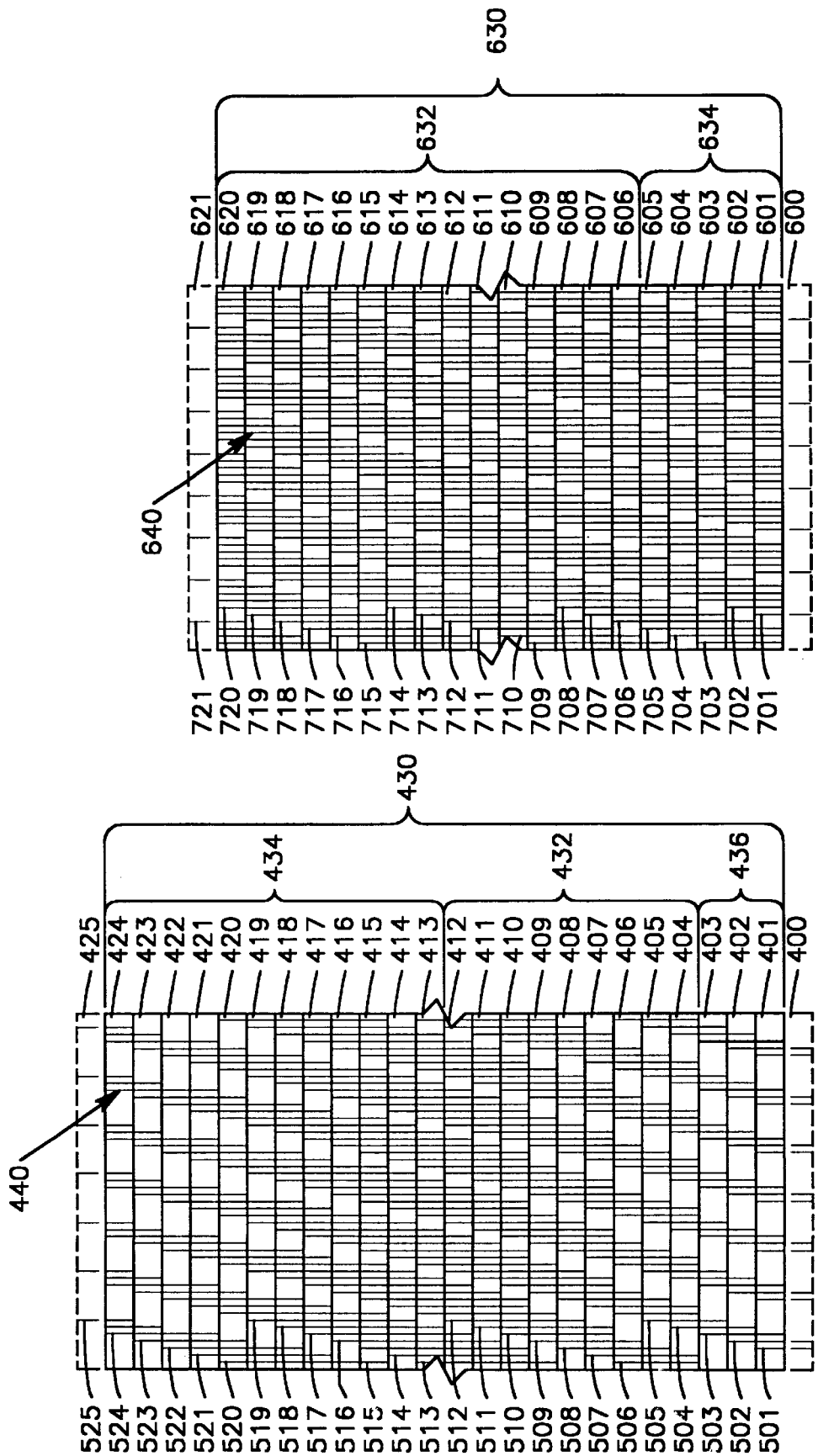

LAMINAR FIBROUS STRUCTURE HAVING Z-FIBERS THAT PENETRATE A CONSTANT NUMBER OF LAYERS

This is a continuation of application Ser. No. 08/538,933 filed Oct. 4, 1995, now abandoned, which is a continuation-in-part of application Ser. No. 08/279,608 filed Jul. 25, 1994, now U.S. Pat. No. 5,515,585.

BACKGROUND OF THE INVENTION

The invention relates to the field of forming fibrous structures. More particularly, the invention relates to cohering a multitude of fibrous layers with Z-fiber bundles that pass between adjacent fibrous layers.

Needling processes for forming fibrous preform structures for use in composite structures have been known for many years. U.S. Pat. No. 3,772,115 to Carlson et al. describes a process whereby several fibrous layers may be needled together simultaneously or in a series of needling steps. The Carlson et al. needling process involves repeatedly driving a multitude of barbed needles into the fibrous layers. The barbed needles displace fiber within the layers which causes the layers to adhere into a coherent structure. The structure may be incrementally formed by adding layers in a series of needling steps if the final structure is too thick to allow the needles to pass all the way through. The fibrous layers comprise carbon or graphite fabric, or precursors thereof. A fibrous preform structure formed according to the process may be further processed into a carbon/carbon composite structure by deposition of a carbon matrix within the fibrous preform structure that binds the fibers together. The Carlson et al. process may be used to form various composite structures, including carbon/carbon brake disks.

A similar process is disclosed in Great Britain Patent Specification 1,549,687, published Aug. 1, 1979. This also discloses a process for forming a carbon/carbon composite material. The fibrous layers may be comprised of oxidized polyacrylonitrile cloth which are needled together in a series of needling steps. In one example, the process was used to form a carbon brake disk.

A more recent process is disclosed by U.S. Pat. No. 4,790,052 to Pierre Olry. The goal is to produce a fibrous reform structure having a high degree of uniformity. This purportedly is accomplished by needling superposed layers together with a "uniform density" of needling throughout the thickness of the article. The initial depth of penetration is determined as a function of the number of layers to be traversed by the needles, for example about twenty layers. The Olry et al. process attempts to keep this depth constant throughout formation of the fibrous preform structure by lowering the fibrous structure away from the needles a distance equal to the thickness of a needled layer each time a new layer is added.

U.S. Pat. No. 4,955,123, issued Sep. 11, 1990 and PCT Publication WO 92/04492, published Mar. 19, 1992, both to Lawton et al., describe a process whereby a brake disk is formed by needling together sectors of an annulus. The fibrous structure is lowered the thickness of a needled layer each time a new layer is added. U.S. Pat. No. 5,338,320, issued as a continuation in part from the '123 patent on Feb. 14, 1995, to Smith et al. describes a process wherein outer layers of a preform are "enriched" with staple fiber in a needling process. Enriching the outer layers in the Smith et al. process apparently increases mechanical strength in the outer layers and improves wear characteristics of a resulting disk brake.

In the fibrous preform art, the displaced fibers generated by the needling process are referred to as "Z-fibers" since they are generally perpendicular to the layers comprising a fibrous preform structure. The Z-fiber distribution throughout a brake disk can have a profound effect on disk wear life and on performance of the brake disk in slowing or stopping an aircraft. Therefore, a fibrous structure having a predetermined Z-fiber distribution and a method for forming a fibrous structure with a predetermined Z-fiber distribution are desired.

SUMMARY OF THE INVENTION

According to an aspect of the invention, a fibrous structure is provided, comprising:

a multitude of superposed fibrous layers including an upper group of fibrous layers and lower group of fibrous layers subjacent the upper group of fibrous layers; and, a multitude of Z-fiber bundles cohering the multitude of fibrous layers, each fibrous layer within the upper group of fibrous layers having a portion of the multitude of Z-fiber bundles originating in that fibrous layer and passing through a number of fibrous layers disposed beneath that fibrous layer without passing through all of the fibrous layers disposed beneath that fibrous layer, the number of fibrous layers being constant within the upper group, and each fibrous layer within the lower group of fibrous layers having a portion of the multitude of Z-fiber bundles originating in that fibrous layer and passing through all fibrous layers disposed beneath that fibrous layer.

According to another aspect of the invention, a process is provided for forming a fibrous structure, comprising the steps of:

forming a multitude of Z-fiber bundles that cohere a multitude of superposed fibrous layers in a series of needling passes, the multitude of fibrous layers including an upper group of fibrous layers and a lower group of fibrous layers subjacent the upper group of fibrous layers, each fibrous layer within the upper group of fibrous layers having a portion of the multitude of Z-fiber bundles originating in that fibrous layer and passing through a number of fibrous layers disposed beneath that fibrous layer without passing through all of fibrous layers disposed beneath that fibrous layer, the number of fibrous layers being constant from the lower fibrous layer to the upper fibrous layer, and each fibrous layer within the lower group of fibrous layers having a portion of the multitude of Z-fiber bundles originating in that fibrous layer and passing through all of the fibrous layers disposed beneath that fibrous layer.

BRIEF DESCRIPTION OF THE DRAWINGS

FIG. 11A depicts a detailed view of the area indicated as 11A in FIG. 11.

FIG. 11B depicts a detailed view of the area indicated as 11B in FIG. 11.

FIG. 11C depicts a detailed view of the area indicated as 11C in FIG. 11.

FIG. 13A depicts a detailed view of the area indicated as 13A in FIG. 13.

FIG. 13B depicts a detailed view of the area indicated as 13B in FIG. 13.

FIG. 14A depicts a table useful for determining a desired fiber transport depth for needling pass 2 of FIG. 13.

FIG. 14B depicts a table useful for determining a desired fiber transport depth for needling pass 3 of FIG. 13.

FIG. 14C depicts a table useful for determining a desired fiber transport depth for needling pass 4 of FIG. 13.

FIG. 15 depicts a sectional view of a fibrous structure having a predetermined Z-fiber distribution according to an aspect of the invention.

FIG. 16 depicts a Z-fiber bundle typically generated by a needling process.

FIG. 17 depicts a sectional view of an annular brake disk formed from a fibrous structure similar to FIG. 15, according to an aspect of the invention.

FIG. 18 depicts a sectional view of a fibrous structure having a predetermined Z-fiber distribution according to an aspect of the invention.

FIG. 19 depicts a sectional view of a fibrous structure having a predetermined Z-fiber distribution according to an aspect of the invention.

DETAILED DESCRIPTION

The invention relates to a process for forming fibrous preform structures. Fibrous preform structures according to the invention are suitable for subsequent processing in which a binding matrix is deposited within the preform structure thus forming a composite structure. The invention is especially suited for forming fibrous preform structures suitable for subsequent processing into carbon/carbon structures such as aircraft brake disks. Subsequent processing conventionally involves pyrolyzing the preform structure (if it is formed from a precursor material), and depositing a binding carbon matrix. Depositing the carbon matrix within the preform structure may be accomplished according to known techniques such as carbon vapor infiltration and carbon vapor deposition (CVI/CVD), or by repeatedly impregnating the substrate with a carbon bearing pitch or resin which is subsequently charred, or by any equivalent process. The invention is not directed to forming the binding matrix or densification of the fibrous preform structure, as these techniques are known in the art. Though described in relation to carbon/carbon composites, it is clearly contemplated that the invention may be used with equal utility for forming fibrous preform structures suitable for subsequent processing into ceramic composite structures and carbon/ceramic composite structures.

Figure 1:
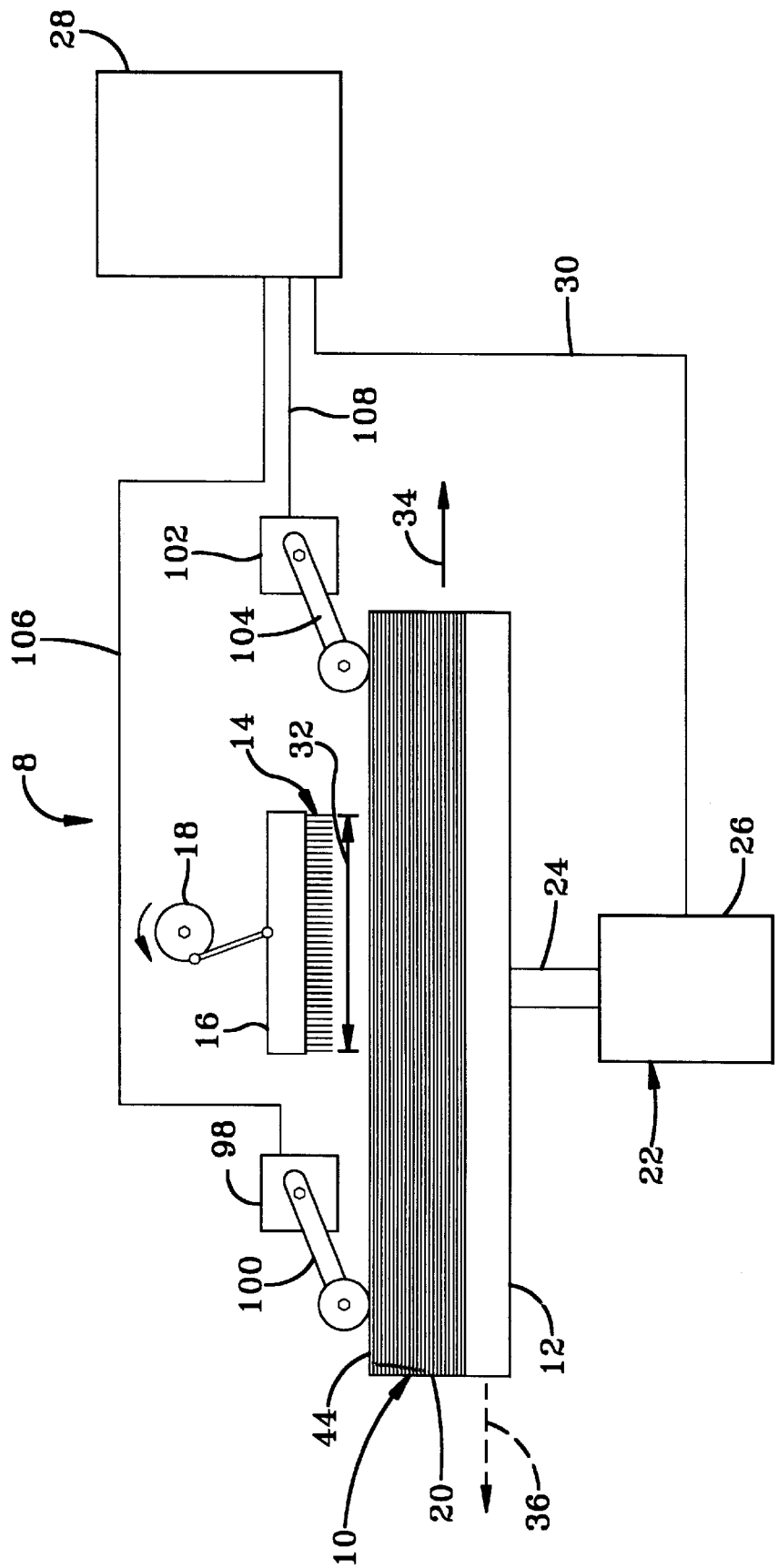
FIG. 1 depicts a general schematic arrangement of a needling apparatus suitable for use with the invention.

Various aspects of the invention are described as follows in relation to FIGS. 1 through 13 wherein like numbered components are equivalent. Referring specifically to FIG. 1, a needling apparatus 8 is schematically depicted. Apparatus 8 is suitable for forming a fibrous preform structure by cohering several fibrous layers together beginning with at least two fibrous layers to which additional fibrous layers are added in a series of needling passes, and is presented in FIG. 1 as only a general arrangement since such devices are well known in the art. Examples of apparatuses suitable for use with the invention are described in U.S. Pat. No. 4,790,052 to Olry (hereinafter the '052 patent); U.S. Pat. No. 4,955,123 to Lawton et al. (hereinafter the '123 patent); and, U.S. Pat. No. 5,217,770 to Morris, Jr. et al. (hereinafter the '770 patent). FIG. 1 is intended to present only the needling zone of any such apparatus. Thus the invention is adaptable for use with an apparatus for forming a sheet or "board" as described in the '052 patent, or for forming an annulus as described in the '123 and '770 patents. Any variation in shape of the fibrous preform structure produced is considered to be within the purview of the invention.

Still referring to FIG. 1, a fibrous preform structure 20 is shown in the process of being formed in apparatus 8. The fibrous structure 20 is disposed on a support or bedplate 12 beneath a multitude of felting needles 14 mounted in a needle board 16. Support 12 is penetrable by the needles 14, and may be formed from a penetrable material such as foamed plastic or brush bristles, or an impenetrable material such as metal or plastic with holes aligned with the needles 14 to allow penetration. Fibrous structure 20 is comprised of fibrous layers with a top layer defining an exposed surface 44. The fibrous structure is then subjected to a needling pass in which the multitude of felting needles 14 are repeatedly driven into the fibrous structure 20 through exposed surface 44 as the fibrous structure 20 is passed beneath the felting needles in the direction of arrow 34. As used herein, the term "fibrous structure" refers to all the fibrous layers disposed on the support 12 beneath the felting needles 14 during a given needling pass. Layers may be added to the fibrous structure at one or more needling passes, but it is not necessary to add a fibrous layer to the fibrous structure at every needling pass.

The felting needles 14 are arranged in an array as is known in the art. Several rows may be arranged parallel to each other so the entire width of the fibrous structure 20 may be subjected to needling with each needling pass. The array of felting needles 14 defines a needling zone 32.

The felting needles 14 are driven by means of a drive mechanism 18 that drives needle board 16 through a fixed range of travel in a reciprocating motion. The multitude of felting needles thereby displace fibers among layers of the fibrous structure 20 producing "Z-fiber" bundles that pass between layers generally perpendicular to the layer interfaces. Additional layers are disposed over previous layers and subjected to additional needling passes which adheres the additional layers to the previous layers. Additional layers are added until a final desired thickness is established. The fibrous structure 20 may then be subjected to further needling passes without adding additional layers. The finished fibrous preform structure 20 can be processed in subsequent operations, in known manner, as previously described.

A support adjustment mechanism 22 adjusts the support position relative to the multitude of felting needles 14 in a manner well known in the art. Here, the support adjustment mechanism comprises jackscrew 24 and motor/gearbox 26. A controller 28 controls the support adjustment mechanism 22 via control line 30 as necessary in order to precisely position the support 12 relative to the multitude of felting needles 14. Support 12 is driven in the direction of arrow 34 such that the multitude of felting needles may be repeatedly driven into the exposed surface 44 along the length of fibrous structure 20. The support may be subsequently driven in the direction of arrow 36 thereby needling the fibrous preform structure in the opposite direction, as described in the '052 patent. The support would normally be driven in only one direction if an annular shape is being formed as described in the '123 or '770 patents. Also, the support 12 may be continuously driven as the needles are driven into fibrous structure 20, or the support may be synchronized with drive mechanism 18 such that the support 12 momentarily stops when the needles 14 are driven into fibrous structure 20. Any such variations are considered to be within the purview of the invention. Also, the various components of apparatus 8 may be oriented in various obvious ways without departing from the invention. For example, apparatus 8 could be rotated onto a side or even inverted if a particular application necessitated such an arrangement.

Figure 2:
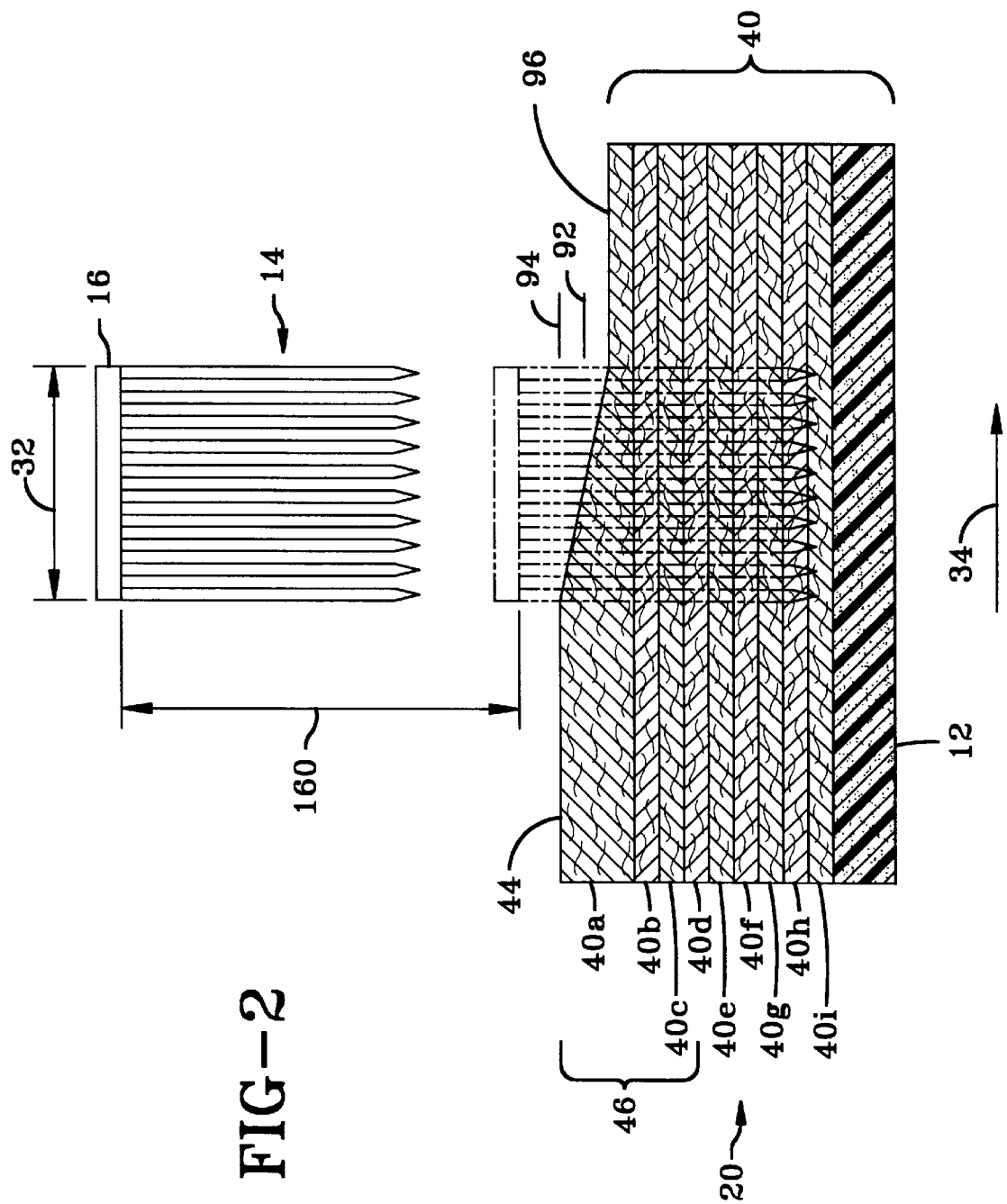
FIG. 2 depicts a detailed view of a needling process using the FIG. 1 apparatus.

A process according to an aspect of the invention is depicted in FIG. 2, wherein a fibrous structure 20 comprising at least two fibrous layers 40*a*–40*i* is disposed beneath the multitude of felting needles 14 on support 12. As depicted, the fibrous structure 20 may comprise a multitude of superposed layers, and the stack of layers may become so thick that the felting needles 14 do not penetrate all the way through the fibrous structure. A top fibrous layer 40*a* is disposed over lower adjacent layers 40*b*, 40*c*, 40*d*, 40*e*, 40*f*, 40*g*, 40*h*, and 40*i* with the top layer 40*a* defining an exposed surface 44. In this example, top layer 40*a* is not adhered to layer 40*b* until it is subjected to a needling pass in which fibrous layers 40*a*–40*i* are passed beneath the multitude of felting needles 14 while the multitude of felting needles 14 are repeatedly driven through the exposed surface 44 into the fibrous structure, as shown in phantom, deep enough to permanently transport fiber from layer 40*a* into lower adjacent layer 40*b*. The needling pass adheres top layer 40*a* to layer 40*b* by permanently transporting fiber from the top layer 40*a* into layer 40*b* and other lower adjacent layers.

According to an aspect of the invention, fiber is permanently transported from a chosen set 46 of layers for each needling pass. The set of layers may change from one needling-pass to the next. Choosing the set of layers is a matter of preform design according to desired final preform properties, and is not part of the invention. In practicing the invention, the set of layers includes at least the top layer 40*a*. The set of layers preferably includes top layer 40*a* and at least one adjacent layer 40*b*. In the example shown in FIG. 2, set 46 includes layers 40*a*, 40*b*, and 40*c*. The set of layers could include more than three layers in many applications.

Figure 3:
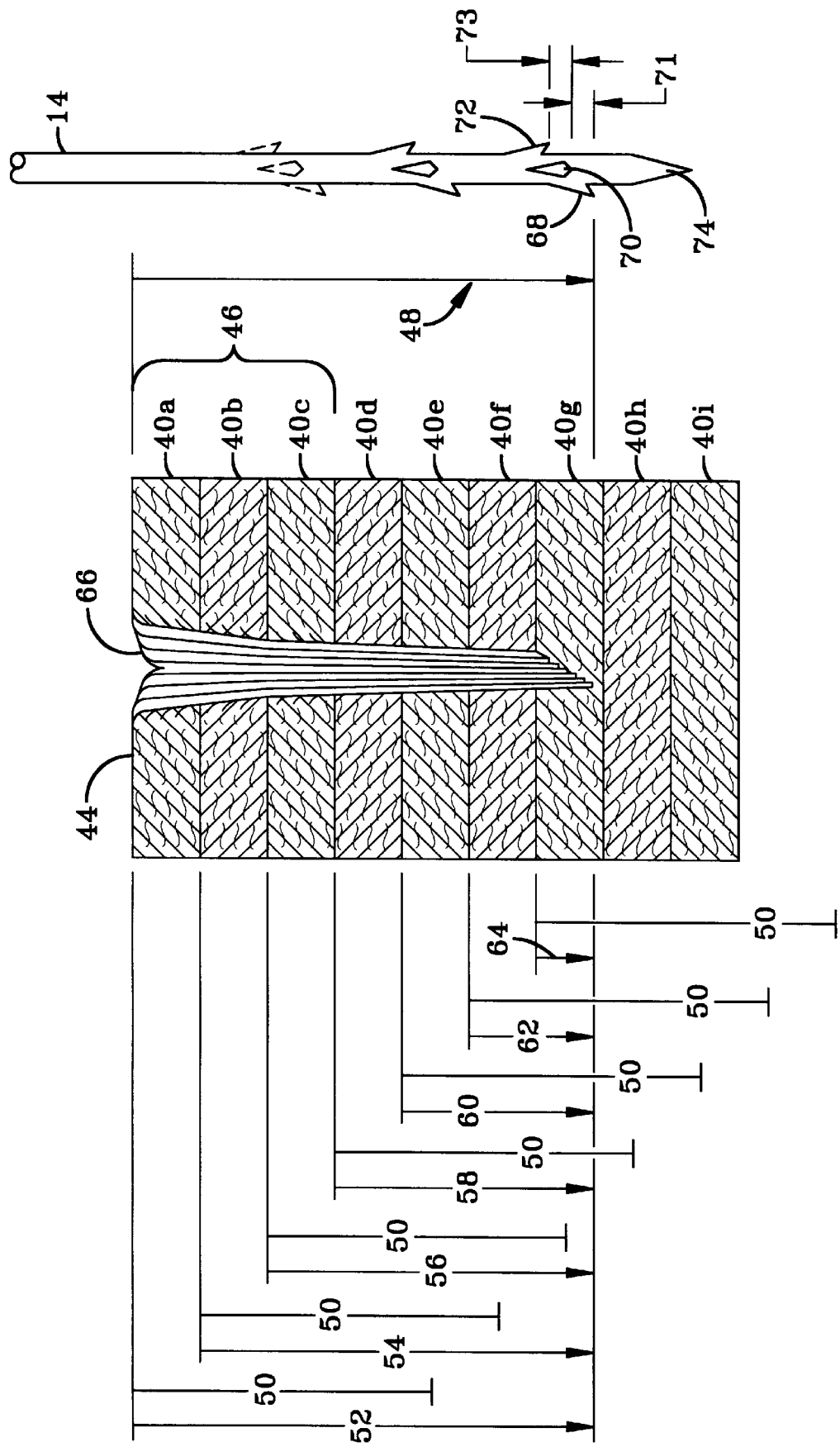
FIG. 3 depicts a detailed view of a Z-fiber bundle generated during the FIG. 2 needling process.

Referring now to FIG. 3, a bundle 66 of Z-fibers generated by a single felting needle 14 is shown extending through the top layer 40*a* and down through the fibrous structure into layers 40*b*–40*g*. Felting needle 14 is shown to one side of the fibrous structure for the sake of clarity. Here, felting needle 14 has a tip 74 and comprises a first barb 68 nearest the tip 74, a second barb 70 spaced from the first barb 68 further away from tip 74, and a third barb 72 spaced from the second barb 70 further away from tip 74. Further sets of barbs may be spaced along the felting needle 14 as shown. In the example shown, barbs 68, 70, and 72 engage and transport fiber from layers 40*a*–40*f* when the felting needle 14 is driven into those layers.

Fibers commonly used as carbon precursor materials such as polyacrylonitrile fiber (PAN) and oxidized polyacrylonitrile fiber (OPF) have resilient qualities that cause the fibers to pull back to the layer from which they originate unless transported at least a minimum distance. When the fibrous layers are made from long or continuous filaments, permanent fiber transport may not be achieved unless the fibers are transported far enough to cause fiber rupture. Temperature and humidity may have an effect. As used herein, the term "permanent fiber transport" means that the felting needles 14 transport fiber from one layer into at least one adjacent layer during a given needling pass that stays transported after the felting needles 14 are withdrawn from the fibrous structure 20. Increasing fiber transport depth by as little as 0.5 mm can result in a transition from no permanent fiber transport to permanent fiber transport. This was a surprising discovery. Thus, the multitude of felting needles 14 together engage and transport an aggregate of fiber from the set of layers during the needling process and less than 100% of the aggregate is permanently transported if the fiber comprising the fibrous layers tends to pull back to its layer of origin as described.

Fiber length, fiber crimp, and fiber surface finish may also affect permanent fiber transport. Staple fibers, or fibers that are crimped or have a rough or scaled surface (similar to wool) may have less of a tendency to pull back to their layer of origin. The minimum distance for fibrous layers comprised of fibers having one or more of these characteristics may be much less than the minimum distance for fibrous layers comprised of smooth, uncrimped, continuous fibers of the same composition. In this case, the minimum distance may have at least a small threshold value since fiber must be transported at least some distance in order to cohere the fibrous layers. With fibers having these characteristics, essentially 100% of the aggregate of fiber engaged by the multitude of felting needles 14 may be permanently transported because the fiber comprising the fibrous layers has little tendency to pull back to its layer of origin.

Thus, according to an aspect of the invention, a desired fiber transport depth 48 is determined relative to the top layer 40a that is sufficient to achieve permanent fiber transport from the chosen set of layers 46 without permanently transporting a significant amount of fiber from more than the chosen set of layers 46. If the fibrous layers have resilient qualities, permanent fiber transport is not achieved until the transport depth exceeds the minimum distance 50.

For example, fiber is transported to a depth 52 from layer 40a, which is greater than minimum distance 50, which means that the fiber transported from layer 40a is permanently transported. Likewise, fiber is transported to depths 54 and 56 from layers 40b and 40c respectively, which are greater than the minimum distance 50, which means that the fiber transported from layers 40b and 40c is permanently transported. Fiber is transported to depths 58, 60, 62, and 64 from layers 40d, 40e, 40f, and 40g respectively, which are less than the minimum distance 50, which means the fiber transported from layers 40d through 40g is not permanently transported. The fiber transported from those layers pulls back to those layers. Thus, fiber is permanently transported from the set 46 of layers without permanently transporting a significant amount of fiber from more than the set 46 of layers.

Figure 4A:
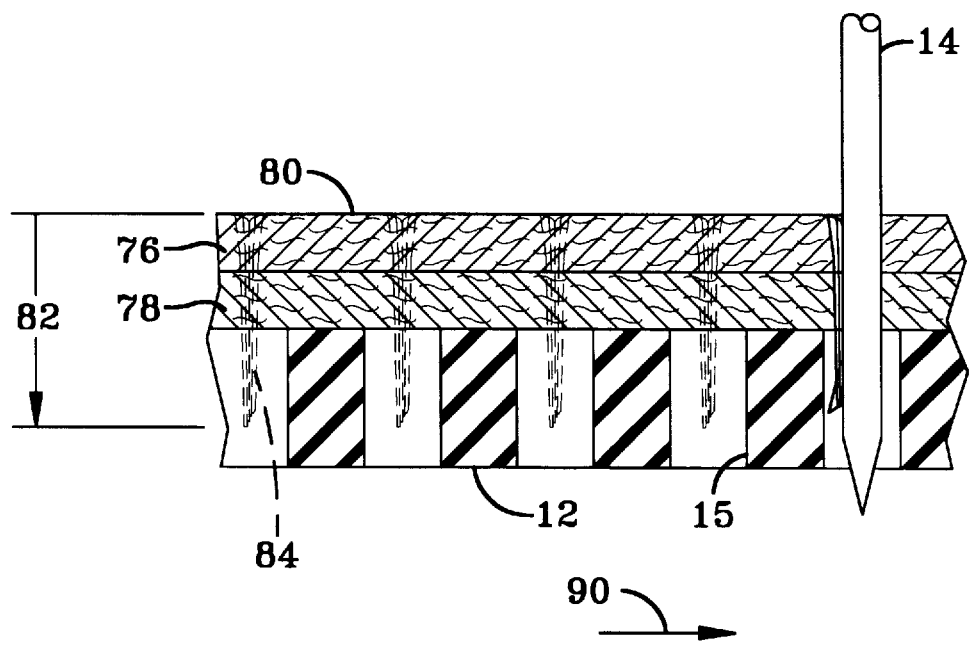
FIG. 4A depicts a first part of a method for determining a minimum fiber transport distance.
Figure 4B:
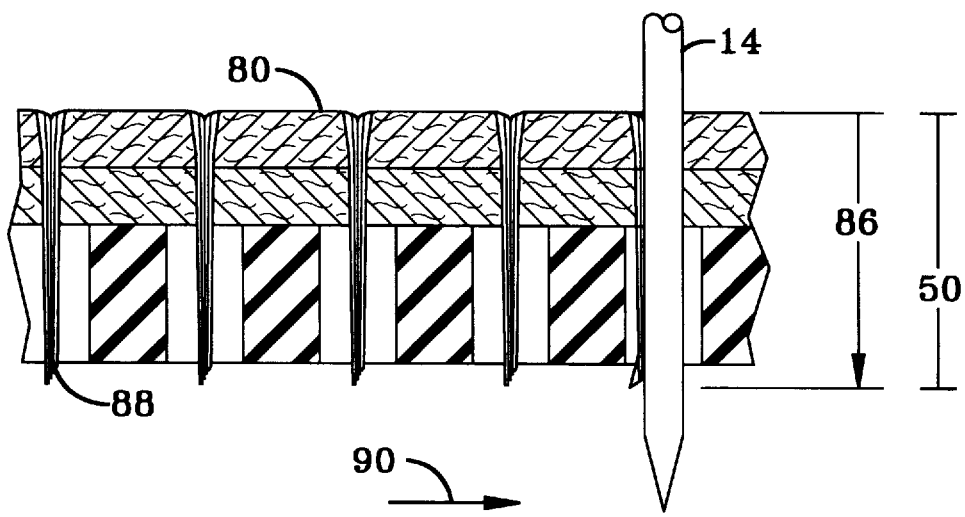
FIG. 4B depicts a second part of a method for determining a minimum fiber transport distance.

A preferred method for determining the minimum distance 50 is depicted in FIGS. 4A and 4B. Referring to FIG. 4A, a first fibrous layer 76 is disposed over a second fibrous layer 78 with the first fibrous layer 76 defining an exposed surface 80. Second fibrous layer 78 is disposed over support 12. The first fibrous layer 76 is substantially similar to top layer 40a of FIG. 3, and the second fibrous layer 78 is substantially similar to layer 40b of FIG. 3. Referring still to FIG. 4A, fiber is transported from the first layer 76 into the second layer 78 by repeatedly driving a multitude of felting needles into the exposed surface 80 through the first layer 76 and into the second layer 78 in a manner substantially similar to the needling process used to form the fibrous preform structure as depicted in FIGS. 1–3, using felting needles 14 substantially similar to those used in the needling process. Only one needle and only one barb are shown for the sake of clarity. Support 12 is perforated by holes 15 that are aligned with the needles 14, which permit penetration of needle 14 into the support 12 as shown. The fibrous layers 76 and 78 are passed beneath the felting needles 14 in the direction of arrow 90 as the needles are driven into the fibrous layers, beginning with fiber transport depth 82. As shown, Z-fiber bundles 84 are created, but pull back to the top layer because fiber was not transported a great enough distance from top layer 76. The portion of the Z-fiber bundle that pulls back is shown in phantom. Referring now to FIG. 4B, the fiber transport depth is increased (by moving support 12 toward the multitude of felting needles 14) until the first layer just begins to tack to the second layer 78, at which point the fiber transport depth 86 corresponds to the minimum distance 50. The first layer 76 begins to tack to the second layer 78 because the transport depth 86 has a magnitude sufficient to permanently transport fiber from the top layer 76 thereby creating permanent fiber bundles 88 that bond the two layers together.

Minimum distance 50 could also be determined by disposing fibrous layer 76 over a multitude of previously needled layers (a fibrous structure or "board"), and performing the process of increasing needle penetration depth until the layer 76 is tacked down. This approach may more accurately quantify minimum distance 50 since the fibrous structure comprises two layers (as shown in FIG. 4) at only the beginning of the process of forming a fibrous preform structure. With only two layers, the Z-fiber bundles extend below the bottom layer into the support. During most of the process, a top layer is disposed over a previously cohered fibrous structure and is subjected to a needling pass (as shown in FIG. 2), and the Z-fiber bundles are completely enclosed within the fibrous structure (as shown in FIG. 3). However, quantifying the minimum distance according to the FIG. 4 process has been found to be quite suitable in the practice of the invention.

According to a preferred embodiment, each of fibrous layers 40 comprise three unidirectional sub-layers of OPF fiber which are lightly needled together into a coherent layer, with the fiber direction of each sub-layer rotated 60° relative to the adjacent sub-layer, as described in EXAMPLE 1 of the '052 patent. The directional orientation of each layer is established by crosslapping a first unidirectional web onto a second longitudinal web before the needling operation. The webs are preferably formed from tows of OPF fiber, each tow being composed of 320,000 filaments. OPF tow suitable for use in the practice of the invention is available from RK Carbon Fibres Limited of Muir of Ord, Scotland, and Zoltek Corporation of St. Louis, Mo., U.S.A. Unoxidized PAN fiber ("greige tow") is available from Courtaulds Advanced Materials of Great Coats Grimsby, South Humberside, England. The minimum distance established according to the FIG. 4 procedure with two of these OPF crosslapped layers was about 6.5 to 7.0 millimeters with felting needles according to catalogue number 15×18×36×3.5 C333 G 1002, available from Groz-Beckert of Germany. The layers just began to tack at a penetration depth of about 6.5 mm and became fully tacked at about 7.0 mm. The OPF fibers of this example had little to no crimp and a very smooth surface. The minimum distance is process dependent on the properties and characteristics of the fibrous layers and the particular needling process to be used in forming the fibrous preform structure. The minimum distance is established empirically.

Transport depth must be known with some degree of certainty in order to quantify permanent fiber transport. As depicted in FIG. 3, fiber transport depth is determined relative to the top layer 40a. Referring again to FIG. 2, the fiber transport depth is preferably determined relative to an estimated surface position 92 of the exposed surface 44 beneath the needles 14 during the needling process. The exposed surface 44 moves away from the needles during the needling pass, due at least in part to compaction of the top layer 40a, as the fibrous structure passes through the needling zone 32. According to a preferred embodiment, the estimated surface position 92 for each needling pass is determined by determining a pre-needled surface position 94 of the exposed surface 44, determining a post-needled surface position 96 of the exposed surface 44, and determining the estimated surface position 92 during needling by averaging the pre-needled surface position 94 and the post-needled surface position 96.

The pre-needled surface position 94 can be actively determined, as depicted in FIG. 1, by a first transducer 98 having a surface following device 100 that tracks the position of the exposed surface 44 before the fibrous preform structure is subjected to needling beneath the felting needles 14. The post-needled surface position can be actively determined by a second transducer 102 having a surface following device 104 that tracks the position of the exposed surface 44 after the fibrous preform structure is subjected to needling beneath the felting needles 14. Surface position information from the first and second transducers 98 and 102 is transmitted to controller 28 via transducer lines 106 and 108. The controller 28 then processes the signals and determines the estimated surface position at each point in the process.

The pre-needled surface position 94 and post-needled surface position 96, and hence the estimated surface position 92, may also be determined by previously forming a substantially similar fibrous preform structure in a substantially similar process and determining the pre-needled surface position 94 and the post-needled surface position 96 during formation of the substantially similar fibrous preform structure. This aspect will be discussed in more detail with respect to FIGS. 6 and 8.

Figure 5A:
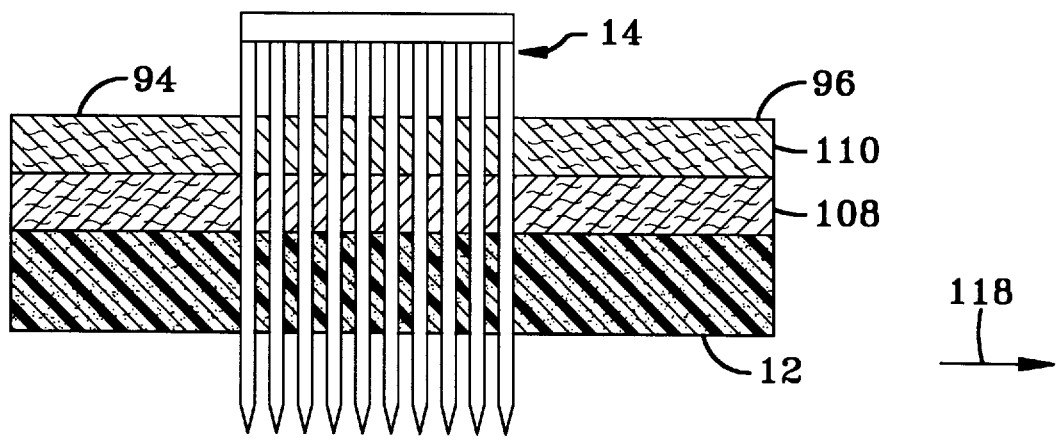
FIG. 5A depicts a first needling pass in a series of needling passes according to an aspect of the invention.

Referring now to FIGS. 5A–5D, a process is depicted according to an aspect of the invention for forming a fibrous preform structure by cohering several fibrous layers together beginning with two fibrous layers 108 and 110 to which additional fibrous layers 112, 114 and 116 are added. As depicted in FIG. 5A, the needling process begins with two layers 108 and 110 that are disposed on the support 12 beneath the multitude of felting needles 14. Each of layers 108, 110, 112, 114, and 116 comprise three unidirectional sub-layers of OPF fiber lightly needled together into a coherent layer, as previously described. The support 12 is formed from metal and perforated with holes into which needles 14 may penetrate. Needles 14 are shown in FIGS. 5A–5D at their furthest downward travel position. In FIG. 5A, fiber is permanently transported from layer 110, through layer 108, and into the support 12 in a first needling pass as the support 12 is driven in the direction of arrow 118. A perforated support such as support 12 does not grip the transported fiber and layers 108 and 110 are not significantly compacted by the needling process. Thus, the pre-needled surface position 94 and the post-needled surface position 96 are about the same. This was a surprising discovery.

Figure 5B:
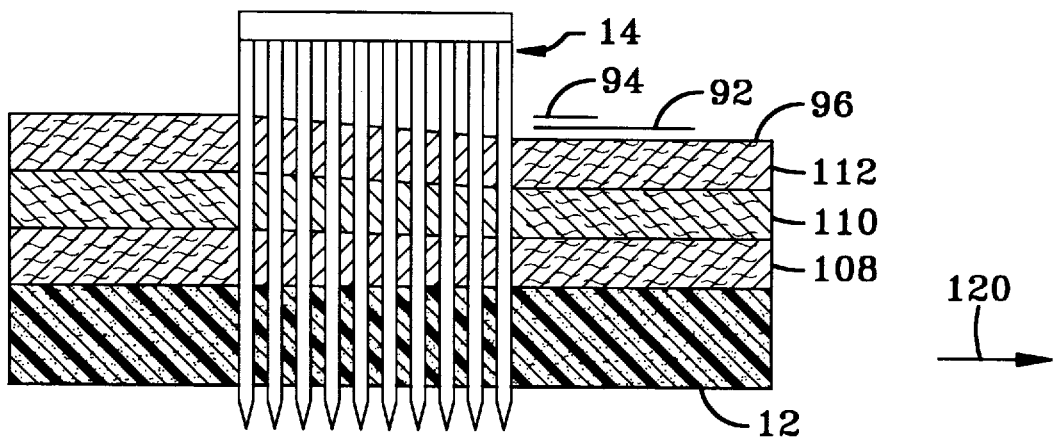
FIG. 5B depicts a second needling pass in a series of needling passes according to an aspect of the invention.
Figure 5C:
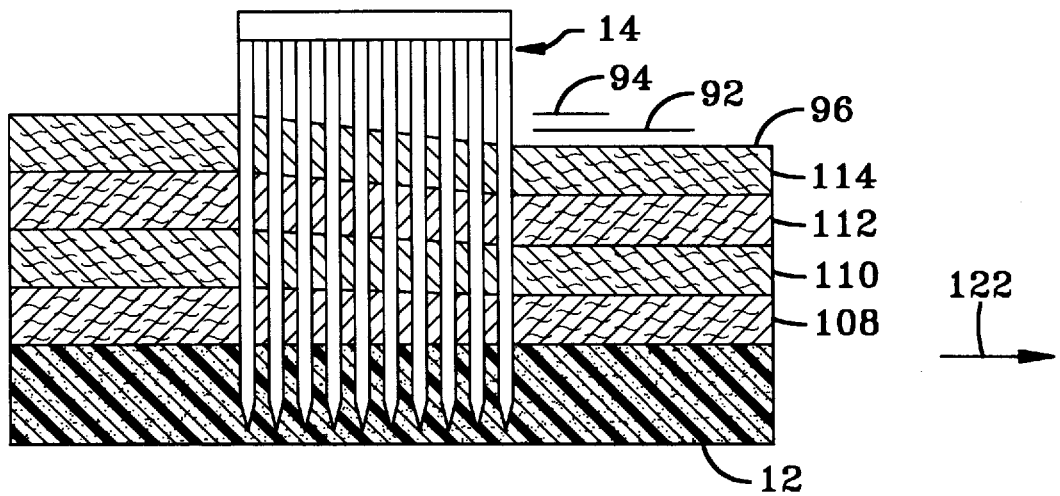
FIG. 5C depicts a third needling pass in a series of needling passes according to an aspect of the invention.
Figure 5D:
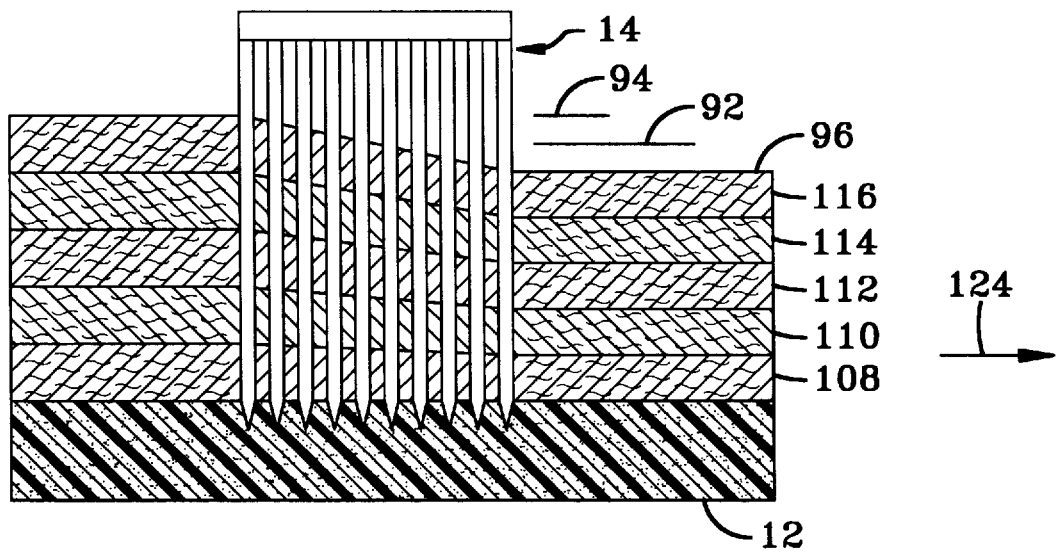
FIG. 5D depicts a fourth needling pass in a series of needling passes according to an aspect of the invention.

In FIG. 5B, an additional fibrous layer 112 is added and needled to layers 108 and 110 in a second needling pass as the support is driven in the direction of arrow 120. At this point, layers 108 and 110 begin to compact and pre-needled surface position 94 is above the post-needled surface position 96, resulting in estimated surface position 92. Another fibrous layer 114 is added in FIG. 5C and needled to layers 108, 110 and 112 in a third needling pass as the support is driven in the direction of arrow 122. Layer 114 is compacted and layers 108, 110 and 112 are compacted some more. In FIG. 5D, another fibrous layer 116 is added and needled to layers 108, 110, 112, and 114 in a fourth needling pass as the support is driven in the direction of arrow 124. Top layer 116 is compacted, and layers 108, 110, 112, and 114 experience more compaction. Thus, the exposed surface into which the needles are driven moves away from the needles during the needling process due at least in part to compaction in the top layer, and due at least in part to compaction within the stack of layers beneath the top layer. In some needling processes, the direction in which the support is driven alternates from one needling pass to the next. Any such variation is considered to be within the purview of the invention.

Figure 6:
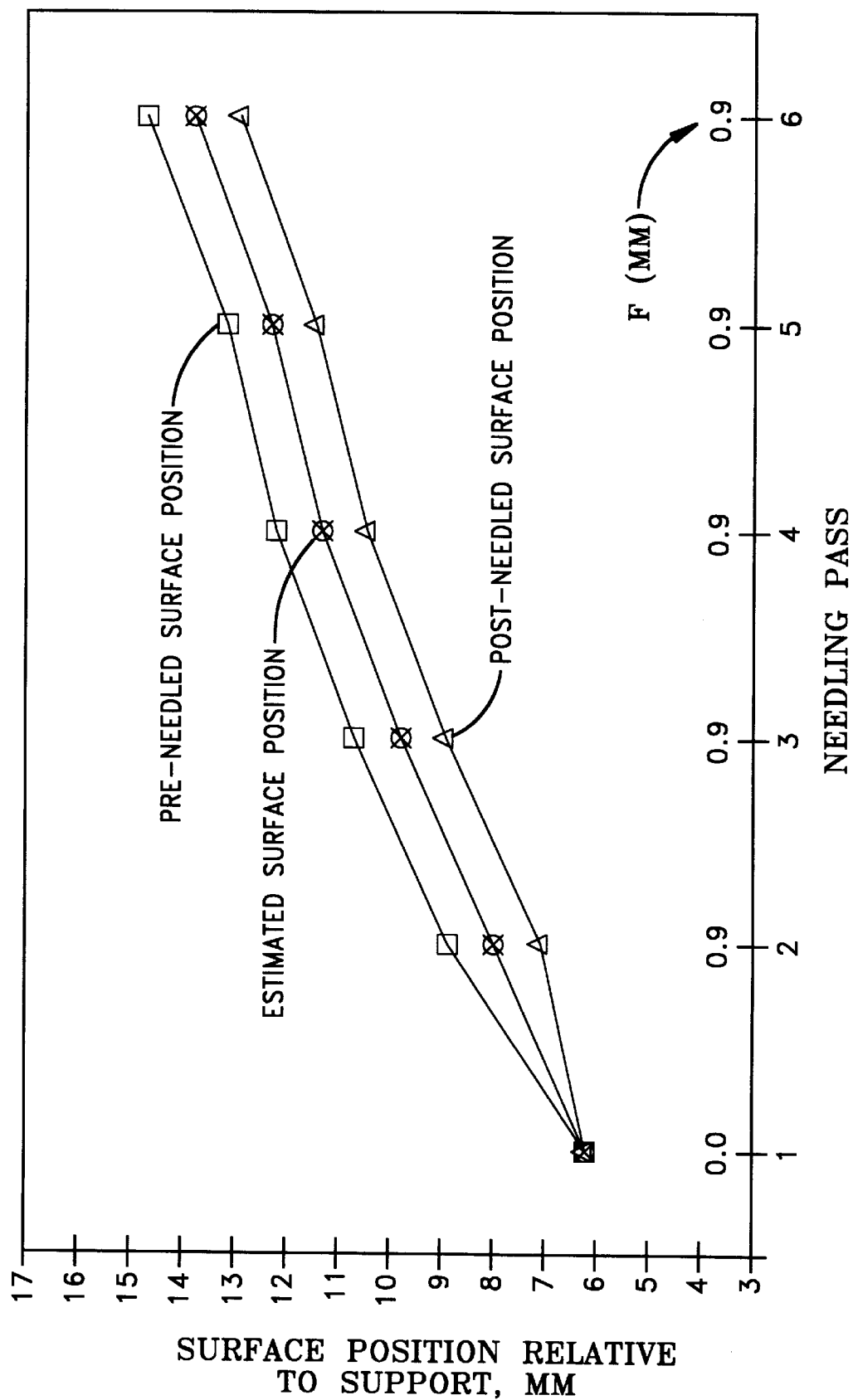
FIG. 6 depicts estimated surface position versus needling pass for the FIG. 5A–5D needling process.

An example of a relationship between surface position and needling pass that represents the FIGS. 5A–5D process is presented in FIG. 6. Needling pass 1 represents FIG. 5A where two layers are disposed beneath the felting needles, and the pre-needled surface position is nearly the same as the post-needled surface position. Another layer is added before each needling pass beginning with needling pass 2. Needling pass 2 represents FIG. 5B where three layers are disposed beneath the felting needles. As shown in FIG. 6, these layers are beginning to compact. Additional layers are added in needling passes 3 and 4 which correspond to FIGS. 5C and 5D. Data from the addition of two layers in needling passes 5 and 6 are also shown. The estimated surface position for each needling step is depicted, which is essentially the average between the pre-needled surface position and post-needled surface position for each needling pass. A compaction factor, F, is also depicted for each needling pass. The compaction factor represents an offset from the post-needled thickness for any given needling pass and establishes the estimated surface position relative to the post-needled surface position. Thus, compensation for compaction in the top layer and the lower layers appears in the compaction factor. According to a preferred embodiment, the compaction factor for a given needling pass is calculated by subtracting the post-needled thickness of the fibrous structure from the pre-needled thickness of the fibrous structure and dividing by two. The compaction factor may be used in a process that characterizes or manipulates the Z-fiber distribution throughout the thickness of a fibrous preform structure. This aspect of the invention will be discussed more fully in relation to FIG. 11 and Equations 7 and 8.

Figure 7A:
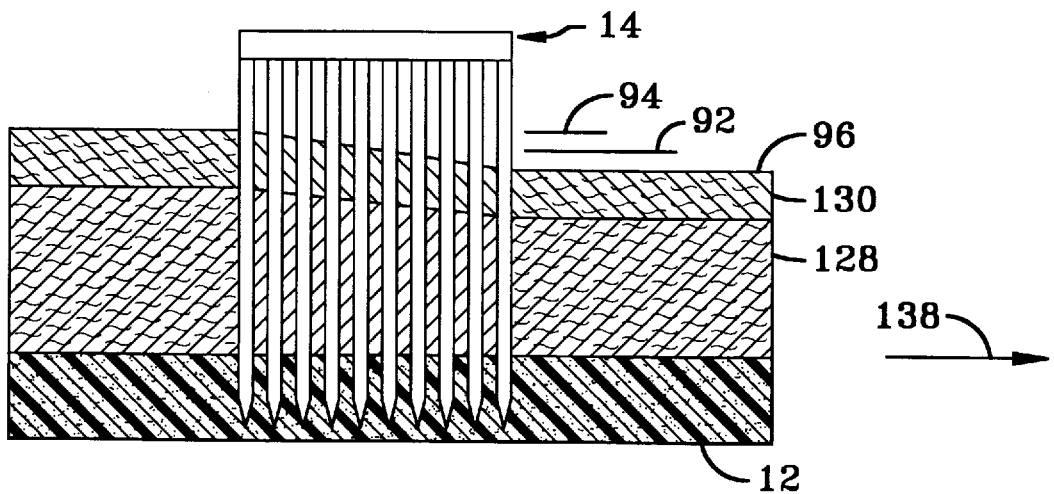
FIG. 7A depicts a first needling pass in a series of needling passes according to an aspect of the invention.

Another process that also represents an aspect of the invention is depicted in FIGS. 7A–7D. The multitude of felting needles 14 are shown at their furthest downward travel in FIGS. 7A–7D. In FIG. 7A, a layer 128 is disposed over support 12 beneath the multitude of felting needles 14. The support 12 is formed from metal and perforated with holes into which needles 14 may penetrate. Another layer 130 is disposed over layer 128. Layer 130 comprises three unidirectional sub-layers of OPF fiber needled together into a coherent layer, as previously described. Layer 128 is an 800 g/m$^2$ pre-needlepunched airlaid OPF web as described in European Patent Application 0 530 741 A1, to Morris et al. Layer 128 is about 8–13 millimeters thick and layer 130 is about 3 millimeters thick before the first needling pass of FIG. 7A. Thus, the pre-needled thickness of layer 128 is much greater than the pre-needled thickness of layer 130. Layer 130 is needled to layer 128 in a first needling pass as support 12 is driven in the direction of arrow 138.

Referring still to FIG. 7A, the layers 128 and 130 are compacted a significant amount during the first needling pass (in contrast to layers 108 and 110 of FIG. 5A) resulting in a large change from the pre-needled surface position 94 to the post-needled surface position 96. The compaction in layer 128 during the first needling pass is due to several factors. Layer 128 is formed of short fibers having a mean length of 25 millimeters or less when measured according to ASTM D 1440, which do not exhibit a great deal of resilient behavior when subjected to needling. In other words, any fiber transported from or within layer 128 by felting needles 14 is permanently transported since the fibers are short and have little tendency to pull back to their starting positions. Layer 128 is also thick enough to permit permanent fiber transport originating and ending entirely within the layer. Also, layer 128 is thick enough to grip fibers transported from layer 130. Finally, layer 128 is more susceptible to compaction since it is thick and of lesser fiber volume (fiber per unit volume), and has not previously been subjected to a great amount of needling.

Figure 7B:
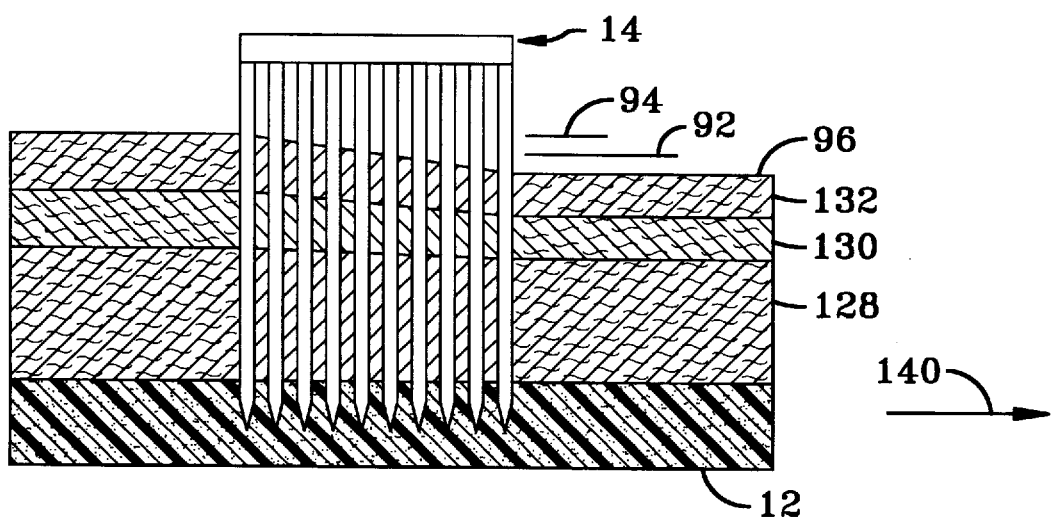
FIG. 7B depicts a second needling pass in a series of needling passes according to an aspect of the invention.
Figure 7C:
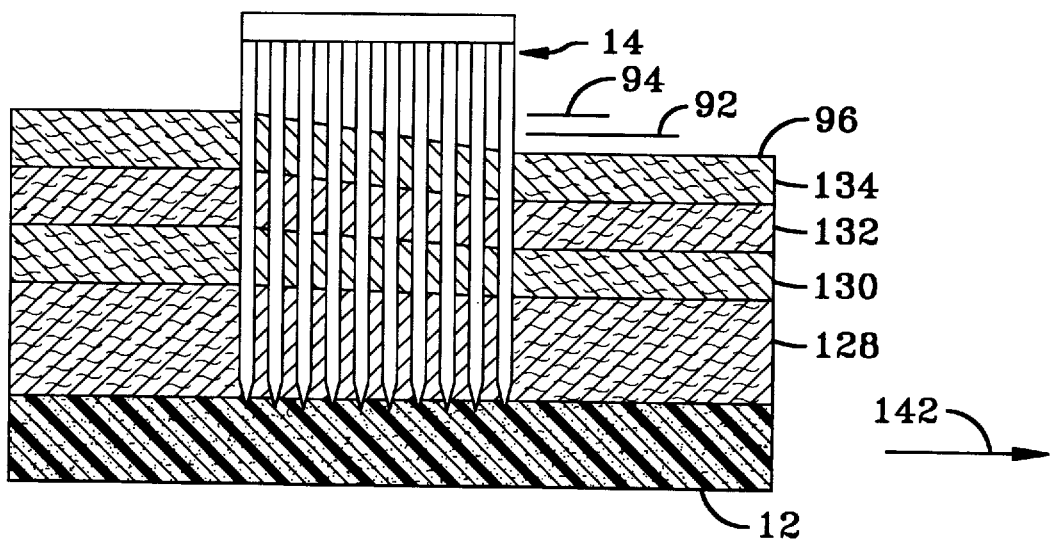
FIG. 7C depicts a third needling pass in a series of needling passes according to an aspect of the invention.
Figure 7D:
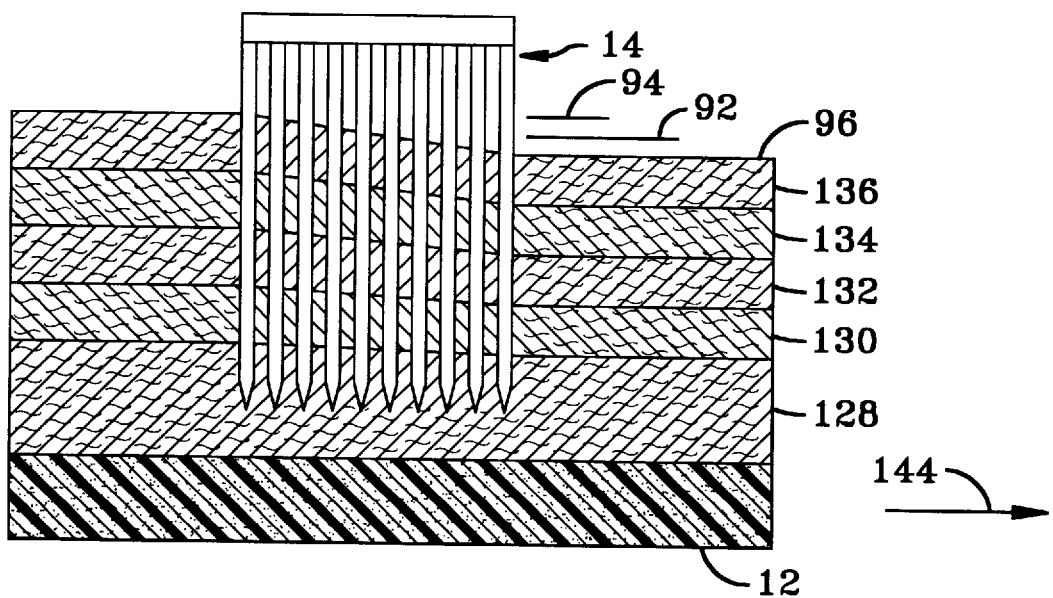
FIG. 7D depicts a fourth needling pass in a series of needling passes according to an aspect of the invention.

An additional layer 132 is added in FIG. 7B which is compacted during a second needling pass as support 12 is driven in the direction of arrow 140. Layers 128 and 130 are further compacted, such that the combined compaction of the layers results in a change from pre-needled surface position 94 to post-needled surface position 96, and an estimated surface position 92. Additional layers 134 and 136 are added and needled in third and fourth needling passes as support 12 is driven in the direction of arrows 142 and 144, respectively, as depicted in FIGS. 7C and 7D. These needling passes cause further compaction of previously needled layers. Once again, the exposed surface into which the needles are driven moves away from the needles during the needling process due at least in part to compaction in the top layer, and due at least in part to compaction within the stack of layers beneath the top layer.

Figure 8:
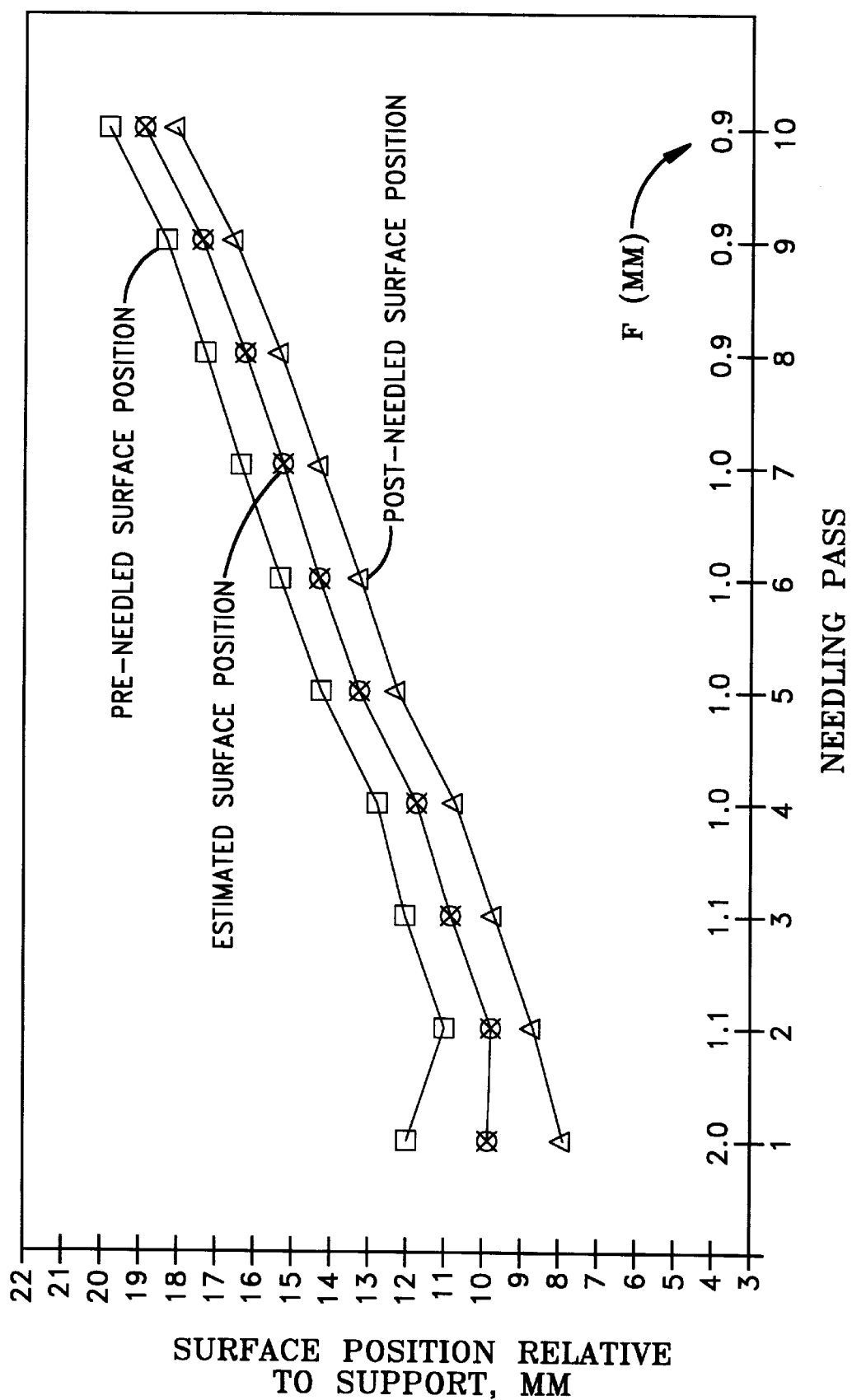
FIG. 8 depicts estimated surface position versus needling pass for the FIG. 7A–7D needling process.

An example of surface position versus needling pass that represents the FIGS. 7A–7D process is depicted in FIG. 8. Needling pass 1 represents FIG. 7A where two layers are disposed beneath the felting needles. As shown in FIG. 8, needling pass 1 induces a relatively large change from pre-needled surface position to post-needled surface position. Another layer is added before each needling pass beginning with needling pass 2. Needling pass 2 represents FIG. 7B where three layers are disposed beneath the felting needles. As shown in FIG. 8, the change from pre-needled surface position to post-needled surface position is less than the previous needling step. Additional layers are added in needling passes 3 and 4 which correspond to FIGS. 7C and 7D. Data from the addition of six layers in needling passes 5–10 are also shown. The estimated surface position for each needling step is depicted, which is essentially the average between the pre-needled surface position and post-needled surface position for each needling pass. Compaction factor F is also depicted. Note that the FIG. 8 compaction factor has a significantly different trend from the FIG. 6 compaction factor.

Experiments have shown that estimated surface position versus needling step and compaction factor as depicted in FIGS. 6 and 8 does not change significantly from one fibrous preform structure to the next, as long as the fibrous preform structures are substantially similar and are formed in substantially similar processes. Therefore, the estimated surface position and compaction factor for each needling pass may be derived from a previously established relationship. In such case, the relationship is established by previously forming a substantially similar fibrous preform structure in a substantially similar process and determining the estimated surface position during formation of the substantially similar fibrous preform structure. FIGS. 6 and 8 represent such previously established relationships that can be subsequently used in the production of other substantially similar fibrous preform structures.

Variations in compaction can arise from different sources. FIGS. 5 and 6 involve a situation where the first two fibrous layers do not significantly compact during the first needling pass. The compaction in these layers occurs during subsequent needling passes. FIGS. 7 and 8 involve a situation where one of the beginning layers is relatively thick and is compacted during the first needling pass, but continues to compact during subsequent needling passes. The process according to the invention is flexible enough to address both of these situations, and application of the invention is not limited to these examples. Compaction can occur in different ways depending on the characteristics of the fibrous layers and the particular needling process and machinery, and may be accounted for according to the principles provided by this disclosure. Further, FIGS. 5 through 8 were derived from fibrous preform structures formed on a perforated bedplate that does not grip the transported fibers, as previously described. A support formed from foamed plastic or upright brush bristles may grip the transported fibers more effectively. However, some compaction effects could still occur and may be addressed according to the principles provided by this disclosure. Any such variations are considered to be within the purview of the invention.

According to another aspect of the invention, permanent fiber transport from each layer in the set of layers may be quantified. However, identifying the exact measure of fiber transported from each layer is not necessary in the practice of the invention. What is meant by "exact measure" is identifying for each layer a certain mass of fibers permanently transported from that layer, or number of fibers transported from that layer, or similar quantification. According to the invention there is provided a technique for generating a relative comparison of transport efficiency and resultant Z-fiber generation for each layer of the fibrous preform structure, or at each stage of the process. This represents a tremendous advantage since tracking and identifying fiber loading and unloading in a particular barb as it passes through the layers is presently extremely difficult. For example, with the fibrous layers and needling processes discussed herein for the purpose of describing the present invention, the barbs on a given needle become completely loaded with fiber almost immediately after penetrating the exposed surface. The barbs unload to some extent as they penetrate into lower layers due to fiber breakage. The barbs engage more fiber from whatever layer they happen to be passing through as they unload. Thus, most of the fiber in Z-fiber bundle 66 of FIG. 3 is from layer 40a, and smaller fractions are from layers 40b and 40c. Identifying the exact measure of fiber in a Z-fiber bundle from a given layer is desirable, but not necessary in the practice of the invention, as long as the fiber permanently transported from a given layer is quantified in some manner.

According to an aspect of the invention, permanent fiber transport is quantified as follows. Referring again to FIG. 3, each barb engages an amount of fiber from a given layer in the set of layers as each barb passes through that layer. The amount is usually different for each barb on a given felting needle. Each felting needle 14 engages and transports a quantity of fiber from a given layer in the set of layers, which is the sum of the amount engaged from that layer by each barb that passes through that layer. For example, in a certain preferred embodiment, the top layer in each needling pass comprises three cross-lapped unidirectional sub-layers of OPF fiber needled together into a coherent layer, as previously described, and the felting needles are catalogue number 15×18×36×3.5 C333 G 1002 needles, available from Groz-Beckert of Germany. In this example, the first barb 68 engages 70% of the quantity transported from a given layer, the second barb 70 engages 25% of the quantity transported from a given layer, and the third barb 72 engages only 5% of the quantity transported from a given layer during a given needling pass. Based on current understanding, tests performed by the needle manufacturer have shown that other barbs spaced further up the felting needle do not engage and transport fiber as effectively in this process. Also, most of the fiber transported by a given felting needle in this process appears to be from the top layer since each barb almost immediately loads with fiber upon being driven into the top layer. The barbs tend to unload and pick up new fiber from other layers as they pass through the fibrous structure, as previously described in relation to FIG. 3. However, this may not be the case for all needling processes or for all types of fibrous layers. The fiber transport characteristics depend on the characteristics of the fibrous layers and the particular needling process and machinery, and should be empirically determined for each system.

The quantity of fiber permanently transported from a given layer, top layer 40a for example, is approximated by summing together the amount engaged from that layer by each barb that travels at least the minimum distance from that layer. For example, barb 68 travels through the transport distance 52 from the top layer 40a, which is greater than the minimum distance 50 from that layer. Therefore, any fiber transported by barb 68 from layer 40a is permanently transported. Barb 70 travels through a distance from top layer 40a as calculated by the following equation:

$$D1_2 = D1_1 - d_1 \quad \text{Eqn. (1)}$$

wherein $D1_2$ is the distance second barb 70 travels from layer 40a, $D1_1$ is the distance first barb 68 travels from top layer 40a ($D1_1$=transport depth 52), and $d_1$ is the distance 71 between the first barb and the second barb 70. $D1_2$ is also greater than the minimum distance 50 from layer 40a, as depicted in FIG. 3, which means that any fiber that second barb 70 transports from layer 40a is permanently transported. Barb 72 travels through a distance from top layer 40a as calculated by the following equation:

$$D1_3 = D1_1 - d_1 - d_2 \quad \text{Eqn. (2)}$$

wherein $D1_3$ is the distance third barb 72 travels from layer 40a, $D1_1$ is the distance first barb 68 travels from top layer 40a ($D1_1$=transport depth 52), $d_1$ is the distance 71 between the first barb and the second barb 70, and $d_2$ is the distance 73 between the second barb 70 and the third barb 72. $D1_3$ is greater than the minimum distance 50 from layer 40a, which means that any fiber that third barb 72 transports from layer 40a is permanently transported. Therefore, 100% of the fiber engaged and transported by the needle from layer 40a by felting needle 14 is permanently transported since $D1_1$, $D1_2$, and $D1_3$ are all greater than the minimum distance 50. This example is based on the previously stated partial quantity estimates of 70% for the first barb, 25% for the second barb, and 5% for the third barb.

Similar calculations may be performed for layer 40b, wherein $D2_1$ is transport depth 54, according to the following equations:

$$D2_2 = D2_1 - d_1 \quad \text{Eqn. (3)}$$

$$D2_3 = D2_1 - d_1 - d_2 \quad \text{Eqn. (4)}$$

wherein $D2_1$ is the distance barb 68 travels from layer 40b, ($D2_1$=transport depth 54), $D2_2$ is the distance second barb 70 travels from layer 40b, $D2_3$ is the distance third barb 72 travels from layer 40a, $d_1$ is the distance 71 between the first barb and the second barb 70, and $d_2$ is the distance 73 between the second barb 70 and the third barb 72. Performing these calculations for this example would show that all three barbs traveled more than the minimum distance from layer 40b, meaning that 100% of the fiber engaged and transported by the needle from layer 4b is permanently transported. Equations 1–4 are defined by the following equation:

$$DN_B = DN_1 - \sum_{b=2}^{B} d_{b-1}; \text{ for } B \geq 2 \quad \text{Eqn. (5)}$$

wherein N specifies a given layer penetrated by the first barb 68 (N=1 for the top layer 40a, N=2 for layer 40b, N=3 layer 40c, . . . ), B indicates a specific barb on the felting needle that transports fiber (B=2 for second barb 70, B=3 for third barb 72, and so on up the needle), $DN_B$ is the distance a specific barb travels relative to layer N, barb and $d_{b-1}$ is the distance from one barb (b−1) to the next barb (b) along the needle. Thus, the calculations can be performed for as many layers as are penetrated by the first barb, and for every barb on a felting needle that engages and transports fiber. However, there is no need to perform the calculations for more than the set of layers since fiber is not permanently transported from more than the set of layers. Equation 5 applies only if $B \geq 2$ because there is no need to determine transport depth for additional barbs if there is only one barb on the needle.

Carrying out the calculations for layer 40c (n=3) using transport depth 56 for $D3_1$ would show that $D3_1$ and $D3_2$ are greater than the minimum distance 50, but $D3_3$ is less than the minimum distance. Therefore, fiber engaged by third barb 72 from layer 40c would not be permanently transported, but fiber engaged by first barb 70 and second barb 72 from layer 40c would be permanently transported. Only 95% of the fiber engaged from layer 40c by the needle was permanently transported (70% for the first barb+25% for the second barb). The 5% of fiber engaged by third barb 72 from layer 40c was not permanently transported. As previously described, these estimates of permanent fiber transport depend on the particular felting needle, fibrous layer characteristics, and needling process. The percentages of 70%, 25% and 5% are used by way of example and are not intended to limit the invention to just these quantities.

It is important to note that permanent fiber transport from each layer is thus quantified without identifying the exact measure of permanent fiber transport from each layer. The quantity of permanent fiber transport in this context refers to the percentage (or any equivalent measure such as a fraction) of fiber engaged by the needle from a given layer at the bottom of the needle stroke that becomes permanently transported. It is quite foreseeable that the quantity of permanent fiber transport may eventually become quantifiable in other ways. For example, using the exact measure for each layer would be desirable if an effective technique for determining the exact measure for each layer becomes available.

Still referring to FIG. 3, the transport depths 54, 56, 58, 60, 62, and 64 from each layer 40a through 40f may be derived from the transport depth 52 relative to top layer 40a. According to a preferred embodiment, the transport depth 52 is determined relative to the estimated surface position of the top layer 40a, as previously described. More preferably, the estimated surface position is an average of the pre-needled surface position and post-needled surface position. A post-needled thickness of each layer disposed beneath the felting needles is then determined. The transport depth for a given layer is determined from transport depth 52 by subtracting the thickness of each layer disposed above that layer from the transport depth 52. For example, transport depth 54 from layer 40b is determined by subtracting the thickness of layer 40a from transport depth 52. The transport depth 56 relative to layer 40c is determined by subtracting the post-needled thicknesses of layers 40a and 40b from transport depth 52. Thus, the transport depth relative to any given layer may be calculated from the transport depth 52 from the top layer 40a according to the following equation:

$$DN_1 = D1_1 - \sum_{n=2}^{N} t_{n-1}; \text{ for } N \geq 2 \quad \text{Eqn. (6)}$$

wherein N specifies a given layer beneath top layer 40a (N=1) penetrated by the first barb 68 (N=2 for the second layer 40b, N=3 for the third layer 40c, N=4 for the fourth layer 40d, . . . ), $DN_1$ is the transport depth from layer N, $D1_1$ is the transport depth from the top layer 40a (transport depth 52), and $t_{n-1}$ is the thickness of the each layer disposed above layer N. The calculations may be repeated for as many layers as are penetrated by the first barb 68 (seven layers in FIG. 3). However, there is no need to perform the calculations for more than the set of layers (layers 40a–40c in FIG. 3) since fiber is not permanently transported from more than the set of layers. This equation is based on the distance the first barb 68 travels relative to the top layer 40a. The distance that additional barbs travel relative to each layer may be calculated according to Equations 1–5.

Alternatively, the transport depth of the first barb from each layer may be calculated as follows:

$$DN_1 = D1_1 - F - \sum_{n=2}^{N} t_{n-1}; \text{ for } N \geq 2 \qquad \text{Eqn. (6a)}$$

wherein the variables are the same as in Equation 6, and F is the compaction factor for that needling pass. This equation calculates transport depth from the sub layers relative to the post-needled position of the exposed surface of the fibrous preform structure. Equation 6 provides an acceptable estimate of transport depth, but Equation 6a is more accurate, especially with a top fibrous layer that has a relatively large compaction factor. The 800 g/m² airlaid web, as previously described, is an example of a fibrous layer having a relatively large compaction factor.

Figure 9:
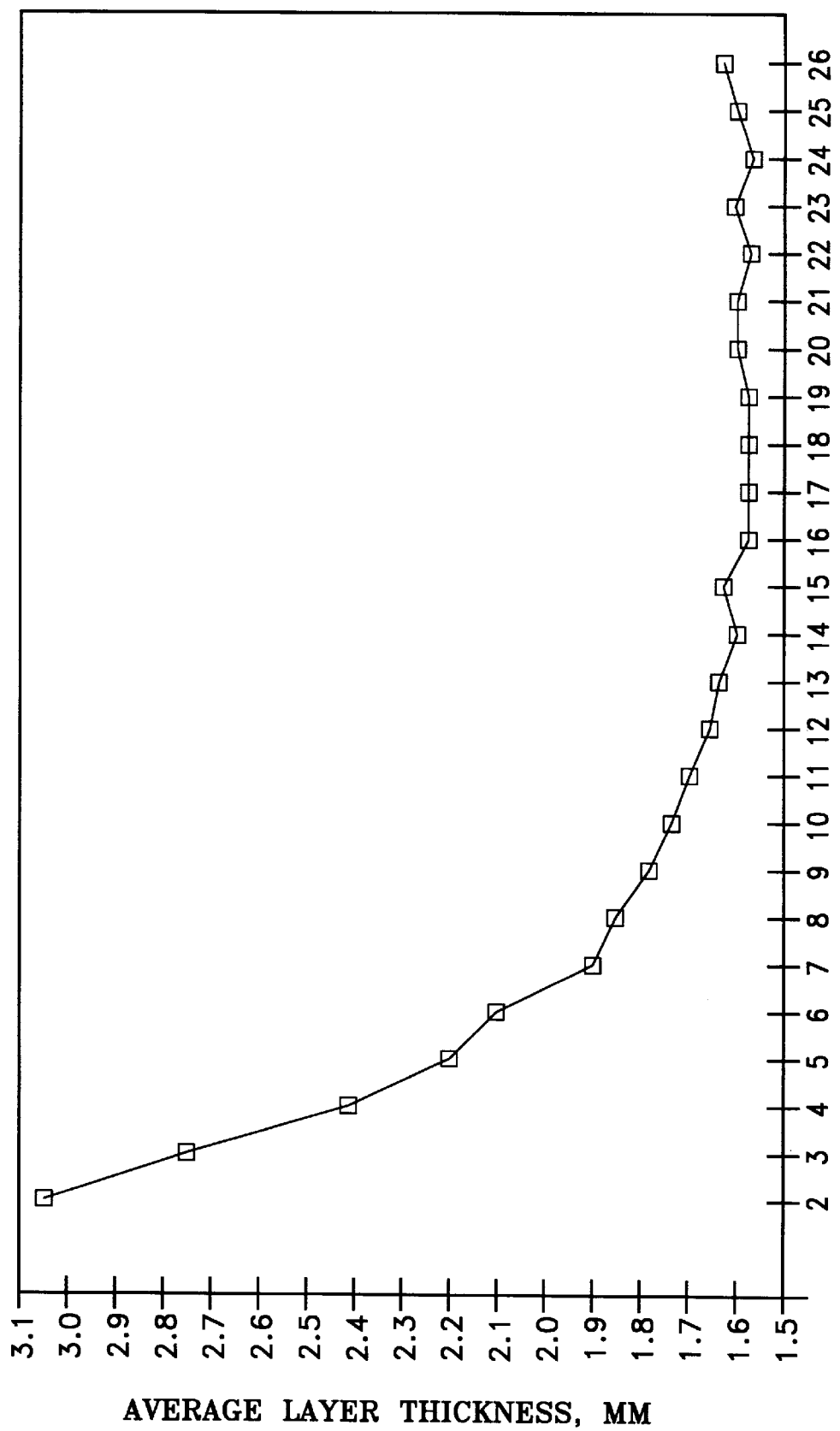
FIG. 9 depicts a compaction curve showing post-needled average layer thickness of the layers comprising a fibrous preform structure versus number of layers according to an aspect of the invention.

If the layers are substantially similar, the post-needled thickness may be calculated for each needling pass as an average thickness of the group of layers comprising the fibrous structure at that needling pass. The thickness of the group of layers may change as the layers are subjected to additional needling passes and as additional layers are added as depicted in FIGS. 5A–5D. An example of a relationship between number of layers and average layer thickness is depicted in FIG. 9, beginning with two layers. FIG. 9 is referred to as a compaction curve. A layer was added to the fibrous preform structure before each needling pass. As shown, average thickness decreases as the number of layers (and needling passes) increases. This trend is caused by the fact that previously needled layers comprising the fibrous structure continue to compact for several subsequent needling passes. These layers compact as additional layers are added.

The average thickness of layers comprising the fibrous structure may be determined at each point in the process from a curve such as that presented in FIG. 9 by previously forming a substantially similar fibrous preform structure in a substantially similar process and determining the average thickness during formation of the substantially similar fibrous preform structure. This information can then be used to form subsequent fibrous preform structures without actively determining the average layer thickness during the process. This approach greatly simplifies the process. A curve such as that presented in FIG. 9 may be programmed into a controller such as controller 28 of FIG. 1.

Figure 10:
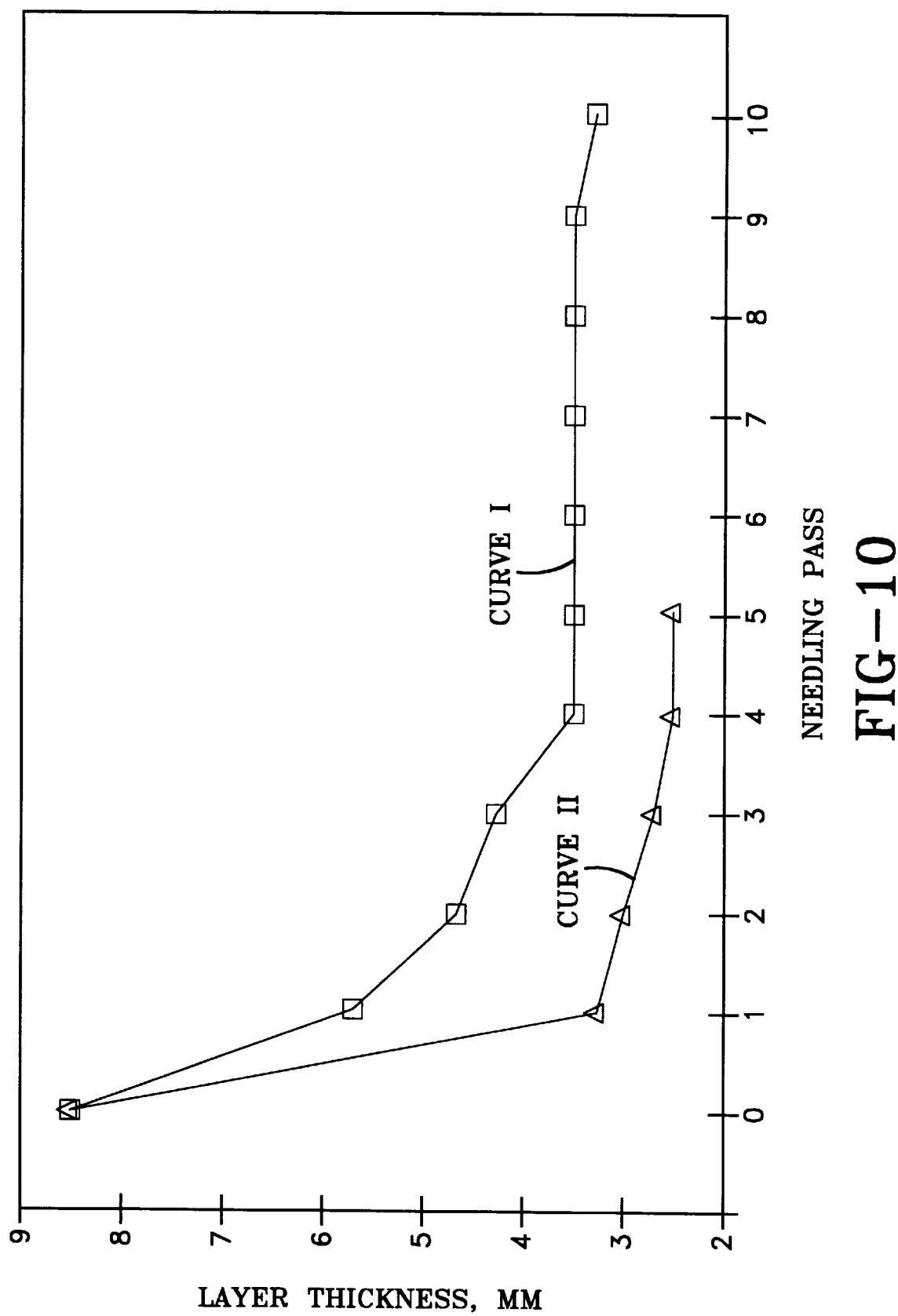
FIG. 10 depicts compaction curves showing layer thickness of an airlaid web versus number of needling passes according to an aspect of the invention.

The thickness of the individual layers may be used rather than the average layer thickness in the practice of the invention. The thickness of layer 128 for a series of needling passes (as shown in FIGS. 7A–7D) was determined by measuring a sliced-off portion of the fibrous structure following each needling pass, and is depicted in FIG. 10 as curve I beginning with the pre-needled thickness (before needling pass 1). Curve II represents the thickness of an airlaid web such as layer 128 when needled to a substantial fibrous structure at a later point in the process. Note that the airlaid web compacts much differently depending on the point in the process at which the layer is applied.

As shown in this FIG. 10, compaction of a thick layer such as layer 128 can continue for several needling passes. Failing to account for this compaction can cause a significant deviation from a desired Z-fiber distribution through the thickness of the fibrous preform structure. Characterizing individual layers is necessary if any of the layers are significantly different from other layers within the fibrous structure. Once again, a curve such as FIG. 10 may be determined during construction of a previously formed fibrous preform structure and used during formation of subsequently formed fibrous preform structures that are substantially similar. The curve should not change a significant amount from formation of one fibrous preform structure to the next as long as the processes are substantially similar.

More than one needling pass may permanently transport fiber from a given layer in the set of layers. Therefore, a technique is desired whereby a cumulative quantity of fiber permanently transported from a given layer may be determined. According to an aspect of the invention, each barb engages an amount of fiber from a given layer in the set of layers as each barb passes through that layer during a given needling pass. A quantity of fiber permanently transported from a given layer during the needling pass is approximated by summing each amount engaged from that layer by each barb that travels at least the minimum distance from that layer, as previously described. A cumulative quantity of fiber permanently transported from a given layer is approximated by summing the quantity from each needling step that permanently transports fiber from the layer. The cumulative quantity of fiber permanently transported from a given layer is conveniently approximated using a table such as that depicted in FIG. 11.

Figure 11:
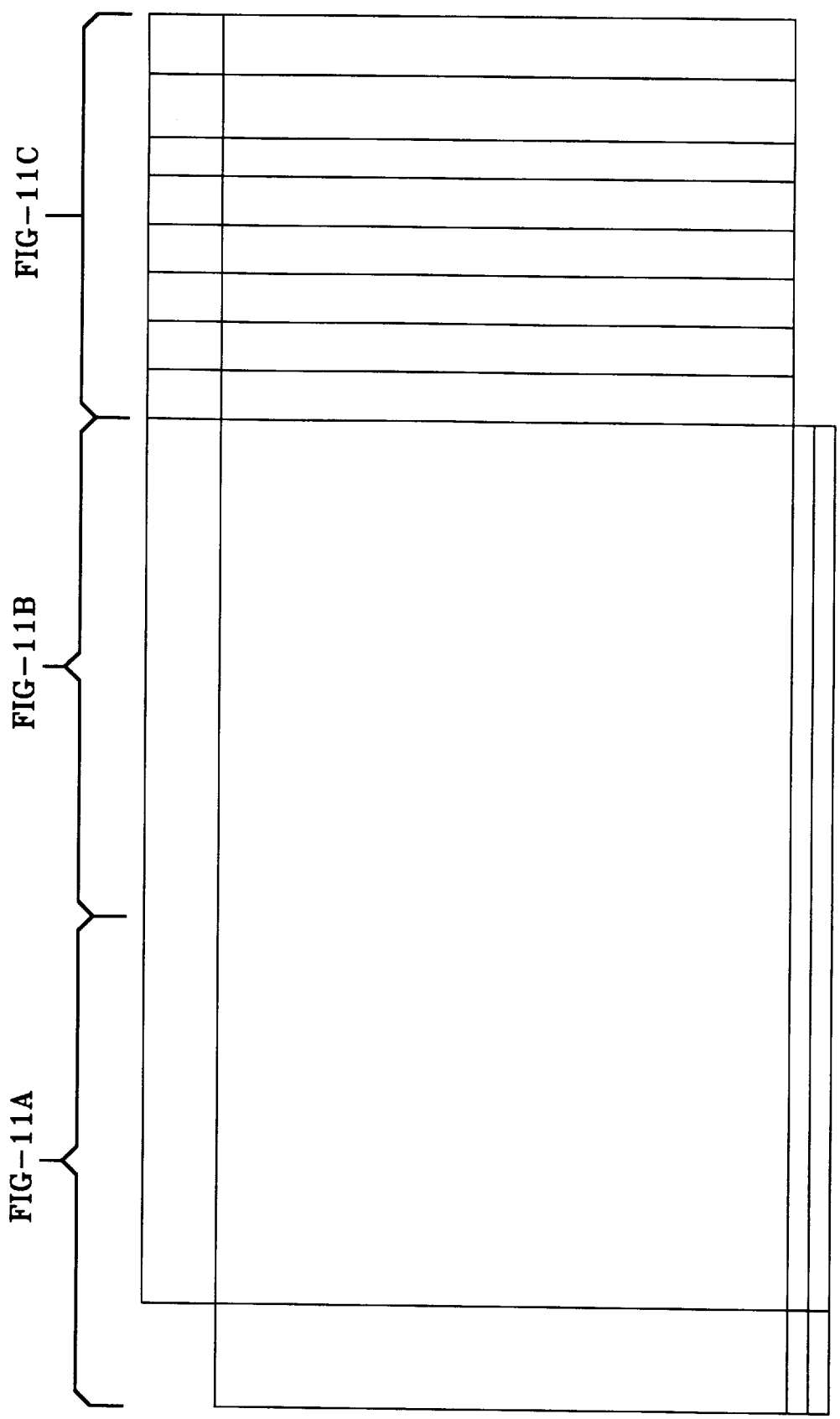
FIG. 11 depicts a schematic of a diagonal matrix for quantifying permanent fiber transport and determining a cumulative quantity of permanent transport for each layer, and a number of Z-fiber bundles per unit area according to an aspect of the invention.

In FIG. 11, needling pass is numbered along a vertical axis on the left side of the table. The layers comprising the fibrous structure for each needling pass are numbered along a horizontal axis at the top of the table. A total of 32 layers were needled together, beginning with layers 1 and 2 at needling pass 1. Layers 1 and 32 were 800 g/m² airlaid web and layers 2 through 31 each comprised three cross-lapped unidirectional sub-layers of OPF fiber needled together into a coherent layer, as previously described. A layer was added before each needling pass from needling pass 2 to needling pass 31, followed by three walkout needling passes WO1, WO2, and WO3 during which the fibrous structure was lowered and needled without adding layers. The bedplate position relative to the initial bedplate position at needling pass 1 is designated as "δ" in the first column on the right of the table. The change in bedplate position for each needling pass from the previous needling pass is shown in the column labeled "$\delta^i - \delta^{i-1}$." As depicted in FIG. 2, the multitude of felting needles 14 were reciprocally driven through a fixed range of travel 160, and the fibrous structure was disposed on the bedplate 12 and moved in the direction of arrow 34. The vertical position of bedplate 12 was controlled such that moving the bedplate 12 toward the multitude of felting needles increased fiber transport depth and moving the bedplate away from the multitude of felting needles decreased fiber transport depth.

Figure 12:
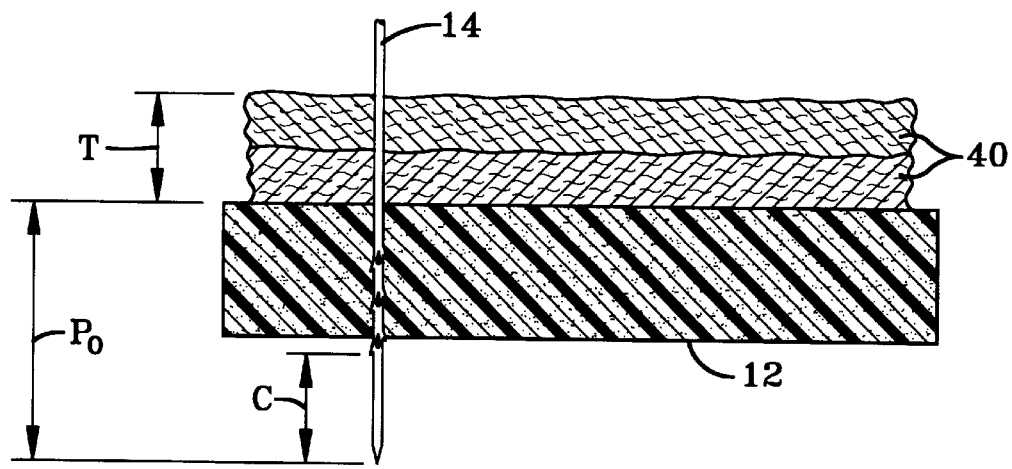
FIG. 12 depicts the relationship of certain variables to needling process geometry.

The total thickness of the fibrous structure after each needling pass is shown in the column labeled "T". A thickness of layer 1 (the airlaid web) was determined for each needling pass and is shown in the column labeled "$t_{air}$", and was determined for each needling pass by measuring sliced-off portions of the fibrous preform structure for each needling pass. It could also be determined from a previously established relationship as previously described in relation to FIG. 10. An average layer thickness $t_{ave}$, after needling, was determined for each needling pass by dividing T by the number of layers comprising the fibrous structure after subtracting the thickness of layer 1 (the airlaid web). The average layer thickness $t_{ave}$, is shown in the column labeled "$t_{ave}$." The transport depth $D1_1$ of the first barb relative to the top layer for each needling pass is shown in the column labeled "Actual $D1_1$" and was calculated according to the following equation:

$$D1_1 = P_0 - c + T + F - \delta \qquad \text{Eqn. (7)}$$

wherein $D1_1$ is the transport depth of the first barb relative to the top layer, δ is the bedplate position relative to the initial bedplate position (a positive δ indicates a movement away from the needles), $P_0$ is the initial needle penetration depth when δ=0, T is total fibrous structure thickness after each needling pass, c is the distance between the first barb and the tip of the felting needle, and F is the compaction factor. FIG. 11, all lineal dimensions are in millimeters. Referring to FIG. 12, $P_0$ is defined as the distance between the tip of the needle and the top of the bedplate when δ=0 at the first needling pass. $P_0$ is positive when the tip of the needle is below the support, as shown in FIG. 12, and negative when the tip of the needle is above the support. The distance c between the tip of the needle and the first barb is also depicted, as well as the total post-needled thickness of the fibrous structure T.

The compaction factor, F, was determined from FIG. 8 for each needling pass. Thus, the post-needled surface position for a given needling pass is determined from the bedplate position δ and post-needled thickness T, and the estimated surface position during needling is determined by adding the compaction factor F to that position.

For this needling process, the minimum distance to achieve permanent fiber transport was about 7 mm as determined according to the process described in relation to FIG. 4. Therefore, all three barbs had to travel at least 7 mm from the upper boundary of a given layer in order to permanently transport fiber engaged and transported from that layer by all three barbs. With the felting needle used in this process, the first barb is spaced 1.06 mm from the second barb, and the third barb is spaced 1.06 mm from the second barb. Therefore, the first barb had to travel at least 9.12 mm (7 mm+1.06 mm+1.06 mm) past the upper boundary of a given layer in order to achieve permanent transport of 100% of the fiber engaged by all three barbs from a given layer by the felting needles. In FIG. 11, it was assumed that the first barb transported 70% of the fiber, the second barb transported 25% of the fiber, and the third barb transported 5% of the fiber, as previously described. At this point, equations 1–6 could be used to calculate the quantity of permanent fiber transport from each layer for a given needling pass. However, the following table may be utilized to reduce the number of calculations by focusing on the transport depth of the first barb relative to each layer:

TABLE 1

| % Permanent Transport From a Given Layer n | Transport Depth of First Barb |
|---|---|
| 100 | $Dn_1 \geq 9.12$ |
| 95 | $9.12 > Dn_1 \geq 8.06$ |
| 70 | $8.06 > Dn_1 \geq 7.00$ |
| 25 | $7.00 > Dn_1 \geq 6.50$ |
| 0 | $Dn_1 < 6.50$ | wherein $Dn_1$ is calculated for each layer according to Equation 6. Table 1 eliminates the need to calculate the transport depths for each individual needle barb. In Equation 6, the average layer thickness $t_{ave}$ at a given needling pass was used for $t_n$ at that needling pass if layer n was a crosslap layer, and $t_{air}$ was used for $t_n$ if layer n was an airlay layer at each needling step.

Referring still to Table 1 and the first range of transport depth ($Dn \geq 9.12$), all three barbs penetrate far enough such that 100% of the fiber is permanently transported (70%+ 25%+5%). In the second range ($9.12 > Dn \geq 8.06$), only 95% of the fiber is permanently transported because only the first and second barbs penetrate far enough to permanently transport fiber. In the third range ($8.06 > Dn \geq 7.00$), only 70% of the fiber is permanently transported because only the first barb penetrates far enough to permanently transport fiber. These ranges are readily deduced from the previously disclosed needling conditions and fibrous layer materials of the FIG. 11 fibrous preform structure. The fourth range of 25% permanent transport reflects an in-between range where the top layer is partially, but not fully, tacked to the adjacent layer according to the FIG. 4 process. As noted in relation to FIG. 4, the top layer begins to tack at a transport depth of about 6.5 mm and fully tacks at about 7.0 mm. Thus, the transition from no tack to full tack for this process appears to occur with an increase of 0.5 mm in transport depth. Including the 25% range provides a lower increment in quantity of permanent fiber transport that reflects this transition range. A table such as Table 1 could be constructed for any needling process and type of fibrous layer. However, the invention is not limited to the Table 1 ranges since these principles may be applied to nearly any fibrous layer material and needling process.

Determining a cumulative quantity of permanent fiber transport according to the FIG. 11 process is demonstrated by the following example. In FIG. 11, $P_0$ is 10.60 mm and c is 6.36 mm. Needling pass number 5 has a transport depth $D1_1$ from the top layer of 13.51 mm as calculated according to Equation 7 (10.6 mm−6.36 mm+12.07 mm+1.0 mm−3.8 mm), which is greater than 9.12 mm which means that 100% of the fiber transported from the top layer, which is layer 6 for needling pass 5, is permanently transported. Thus, a "100" appears in layer 6 for needling pass 5. The transport depth $D2_1$ from layer 4 is 11.81 mm (13.51 mm−1.70 mm), which is greater than 9.12 mm which means that 100% of the fiber transported from layer 5 is permanently transported during needling pass 5. Thus, a "100" appears in the layer 5 column of needling pass 5. The transport depth $D3_1$ from layer 4 is 10.11 mm (13.51 mm−1.70 mm−1.70 mm), which is greater than 9.12 mm which means that 100% of the fiber transported from layer 4 is permanently transported during needling pass 5. Thus, a "100" appears in the layer 4 column of needling pass 5. The transport depth $D4_1$ from layer 3 is 8.41 mm (13.51 mm−1.70 mm−1.70 mm−1.70 mm), which is less than 9.12 mm but is greater than 8.06 mm which means that 95% of the fiber transported from layer 3 is permanently transported during needling pass 5. Thus, a "95" appears in the layer 3 column of needling pass 5. The transport depth $D5_1$ from layer 4 is 6.71 mm (13.51 mm−1.70 mm−1.70 mm−1.70 mm−1.70 mm), which is less than 7.0 mm but greater than 6.5 mm which means that 25% of the fiber transported from layer 2 is permanently transported. Thus, there were five layers in the set of layers at needling pass 5 (layers 2–6). These calculations are repeated for all the needling passes and the quantities of transport for each needling pass are entered into the table as described. After doing so, a cumulative quantity of fiber transport for each layer is calculated by summing all the quantities of permanent transport appearing in the column for each layer. For example, layer 4 is subjected to permanent transport quantified as 100 during pass 3, 100 during needling pass 4, 100 during needling pass 5, 95 during needling pass 6, and 25 during needling pass 7 for a total of 420 that appears at the bottom of the matrix. The sum of the quantities of permanent fiber transport for each layer is called the cumulative quantity of permanent fiber transport (CQT). The CQT quantifies total permanent fiber transport from each layer when fiber is permanently transported from a layer by at least two needling passes.

The thickness of layer 1 was derived from Curve I of FIG. 10 and the thickness of layer 32 was derived from Curve II of FIG. 11 since both these layers were airlaid web. Note that these layers compact differently since they are added at different points in the process. Thus, the invention is flexible and able to compensate for variations in compaction characteristics that occur throughout the process.

The CQT for all the layers appears in a row along the bottom of the FIG. 11 matrix labeled "Actual CQT." Note that the CQT generally decreases from a high of 465 at layer 3 to a low of 200 at layer 32. When forming a brake disk, several layers are removed during and after the densification process resulting in two opposing wear surfaces spaced from each other. The CQT at both wear surfaces (WS) is presented in FIG. 11. The CQT at one surface is about twice the CQT at the other wear surface (420/220). This non-uniformity has been verified by interlaminar peel tests of the fibrous preform structure characterized by FIG. 11. The force necessary to peel layers apart decreases as CQT decreases which follows from the fact that the CQT quantifies the amount of Z-fiber permanently transported. A higher CQT indicates a higher quantity of Z-fiber, and Z-fiber is responsible for cohering the layers. Thus, more Z-fiber equates to a higher interlaminar peel force.

The process may be carried a step further wherein the needling process is manipulated to generate a chosen CQT for each layer. Choosing the CQT for each layer comprising the fibrous preform structure is a matter of preform design according to desired properties of the final fibrous preform structure, and is not part of the invention. Equation 8 as follows may be used to achieve a desired quantity of permanent transport for each layer:

$$\delta^i = P_0 - c + T^{i-1} + W^i - D1_1^i \qquad \text{Eqn. (8)}$$

wherein $\delta^i$ is $\delta$ for the current needling pass I, $T^{i-1}$ is the total thickness of the fibrous structure from the previous needling pass I-1, $W^i$ is a prediction factor, and $D1_1^i$ is the desired transport depth $D1_1$ for the current needling pass. The prediction factor $W^i$ is the sum of the projected thickness of the top layer following the current needling pass and the projected compaction factor for that needling pass.

Two approaches are possible using Equation 8 to achieve a desired CQT for each layer in a fibrous preform structure. In some cases, the transport depths $D1_1^i$ for each needling pass may be known that will generate a desired CQT for each layer. Matching the transport depths $D1_1^i$ during construction of a similar preform structure with the known transport depths $D1_1^i$ may generate a similar CQT for each layer. Establishing known transport depths that will generate a desired CQT for each layer may be accomplished, for example, by using Equation 7 and the principles discussed thus far in relation to the invention to characterize a fibrous preform structure formed by a particular process and to determine a transport depth for each needling pass, and a resulting CQT for each layer. A process for characterizing $D1_1$ for each needling pass and a CQT for each layer in a preform structure was previously described with great detail in relation to FIG. 11, and using Equation 7. An example of such information that may be obtained from a previously constructed fibrous preform structure is presented in the "Desired $D1_1$" column and the "Desired CQT" row of FIG. 11.

A preform structure having "Actual $D1_1$" transport depths and "Actual CQT" quantities substantially similar to the "Desired $D1_1$" transport depths and "Desired CQT" quantities may be constructed as follows. Equation 8 is used to calculate $\delta^i$ for each needling pass. First, the prediction factor $W^i$ must be determined. According to a preferred embodiment, $W^i$ for a given needling pass (I) is derived from data obtained from the previous needling pass (I-1). More preferably, $W^i$ is derived by summing $t_{ave}^{i-1}$ and $F^{i-1}$ if the current layer (I) is substantially the same as the previous layer (I-1). Alternatively, layer thickness and F for a given needling pass may be derived by using curves such as those presented in FIGS. 8 and 10, especially if the layers are not substantially similar. Referring again to FIG. 11 and using needling pass 5 as an example, data from needling pass 4 was used to determine a $W^5$ of 2.91 mm for needling pass 5 by summing $F^4$ (1.0 mm) and $T_{ave}^4$ (1.91 mm). Thus, $\delta^5$ is 3.8 mm (10.6 mm−6.36 mm+11.18 mm+2.91 mm−14.53 mm) for needling pass 5, according to Equation 8, and using the desired transport depth of 14.53 mm at needle pass 5 for $D1_1^5$. The support is then adjusted to a $\delta^5$ of 3.8 mm and the fibrous structure is subjected to needling pass 5.

Equation 8 may thus be used to calculate $\delta^i$ for each needling pass. The support is adjusted to that $\delta^i$ and the fibrous structure is subjected to that needling pass. After a given needling pass is performed, the fibrous layer thicknesses comprising the fibrous structure for that needling pass are determined, as previously described, and Equation 7 is used to establish the actual transport depth for that needling pass which serves to verify that the process is on track. The actual transport depth calculated for each needling pass appears in the column labeled "Actual $D1_1$", which has already been described in great detail.

Actual CQT versus desired CQT for this process is shown at the bottom of FIG. 11. The actual CQT is preferably within ±10% of the desired CQT at each needling pass. Constructing a preform according to this process allows the process to actively correct itself for any variations that occur during the process, and results in an actual Z-fiber distribution that closely approximates the desired Z-fiber distribution. Variations may arise from compaction and subtle changes in fibrous layer thickness during the process, and other sources.

Figure 13:
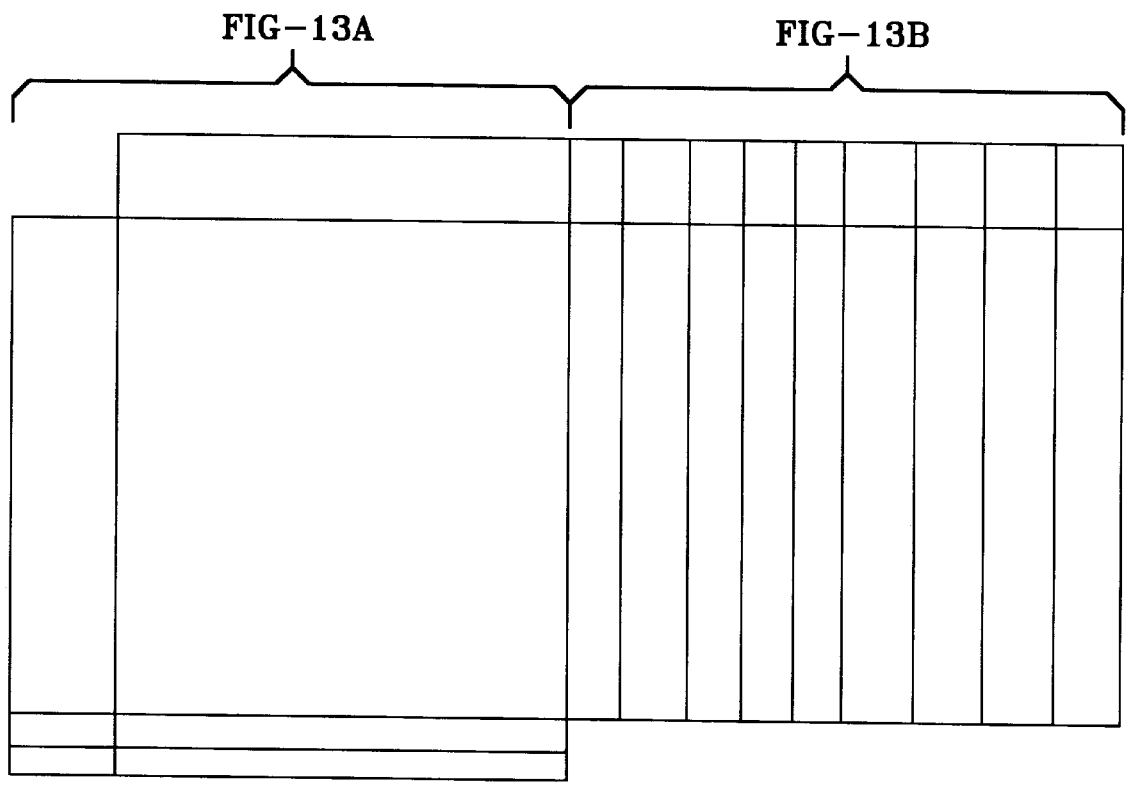
FIG. 13 depicts a schematic of a diagonal matrix for quantifying permanent fiber transport and for manipulating a cumulative quantity of permanent transport for each layer, and a number of Z-fiber bundles per unit area according to an aspect of the invention.

According to another approach that also represents an aspect of the invention, the quantity of permanent fiber transport of each layer may be manipulated at each needling pass to achieve a desired CQT for each layer. Referring to FIG. 13, a table is presented that was used to construct a fibrous preform structure having a substantially constant CQT value through a number of adjacent layers. In this example, a CQT value of 270 was desired for each layer, which appears in a row along the bottom of the table. The actual CQT for each layer is also depicted, and closely follows the desired CQT. Thirteen layers were needled together, each layer being comprised of three cross-lapped unidirectional sub-layers of OPF fiber needled together into a coherent layer, as previously described. The quantity of permanent transport from each layer for each needling pass was manipulated as follows.

The process began by needling layers 1 and 2 together by subjecting those layers to needling pass 1. Equation 7 was then used with appropriate measurements of the fibrous preform structure to calculate the actual $D1_1$ of 11.12 mm for needling pass 1, which appears in the furthest column to the right of FIG. 13. In this process, $P_0$ was 11.0 mm and c was 6.36 mm. The initial bedplate setting for needling pass 1 is a matter of judgment, and should be sufficient to cohere the layers. The initial bedplate position $\delta^1$ preferably results in an initial transport depth $D1_1^1$ that is reasonably deep enough to achieve 100% transport from layers 1 and 2 during needling pass 1 without over-needling the layers. As before, the column labeled "T" is the post-needled thickness of the preform, and the column labeled "$t_{ave}$" is the average layer thickness calculated by dividing T by the number of layers comprising the fibrous preform structure at each needling pass. The compaction factor, F, is derived from FIG. 6 and also appears in FIG. 13.

Beginning with needling pass 2, a desired transport depth $D1_1{}^2$ is determined that is sufficient to achieve a desired quantity of permanent fiber transport from each layer in a set of layers. The set of layers and the quantity for each layer are determined at each needling step as necessary to generate the desired CQT for each layer. At needling pass 2, for example, permanent transport from layer 3 should be 100% since layer 3 has not yet been needled and a CQT of 270 is desired, permanent transport from layer 2 should be 100% since layer 2 has a CQT of only 100 after needling pass 1 and a CQT of 270 is desired, and permanent transport from layer 1 should be 100% since layer 1 has a CQT of only 70 after needling pass 1 and a CQT of 270 is desired. The desired quantities may be arranged in a matrix such as that presented in FIG. 14A. The layer numbers from FIG. 13 appear in the first column of FIG. 14A. The second column, N, indicates a given layer in the set of layers as used in Equations 1 through 6. Note that the layer numbers of the first column do not match N because N is always 1 for the top layer in the set of layers. The desired quantity of transport from each layer appears in the next column. Finally, an estimated layer thickness for all but the lowest layer in the set of layers appears in the last column. According to a preferred embodiment, the average layer thickness from the previous needling step is used as the estimated layer thickness. Thus, 3.24 mm ($t_{ave}$ from needling pass 1) appears in the depth column for layers 2 (N=2) and 3 (N=1). A desired transport depth relative to the lowest layer in the set of layers is then determined and placed in the depth column of FIG. 14A for the lowest layer. In this example, this transport depth is $D3_1{}^2$ since N=3 for the lowest layer. According to a preferred embodiment, a table such as Table 1 is used to determine the desired transport depth. Using this table, $D3_1{}^2$ must be at least 9.12 mm in order to achieve 100% permanent transport from layer number 1 (N=3). The transport depth $D1_1{}^2$ relative to the top layer (N=1) is determined by summing the numbers that appear in the "Depth" column of FIG. 14A resulting in a desired value of 15.60 mm. The desired transport depth $D1_1$ for each needling pass appears in the "Desired $D1_1$" column of FIG. 13. The desired transport depth $D3_1$ for each needling pass appears in the "Desired $D3_1$" column of FIG. 13.

The estimated transport depth $D1_1{}^2$ was then used in Equation 8 to determine a bedplate setting for needling pass 2. According to a preferred embodiment, $W^i$ of Equation 8 is determined by summing $t_{ave}{}^{i-1}$ and $F^{i-1}$ as previously discussed in relation to FIG. 11 and Equation 8. For needling pass 2, $W^2$ is 3.24 mm, and $\delta^2$ is –1.2 mm (11.0 mm–6.36 mm+6.48 mm+3.24 mm–15.60 mm). The support position $\delta^2$ is negative which indicates a movement toward the felting needles relative to the initial support position at needling pass 1. The support was adjusted to $\delta^2$ and the fibrous structure was subjected to needling pass 2.

After the needling pass, appropriate measurements were made and Equation 7 was used to calculate the actual transport depth $D1_1{}^2$ for the second needling pass, which was 14.61 mm. The actual transport depth $D1_1{}^i$ for each needling pass appears in the "Actual $D1_1$" column of FIG. 13. The actual quantities of permanent transport were then calculated and inserted in FIG. 13 according to previously described techniques. For needling pass 2, the desired transport depth was sufficient to achieve the desired quantities of 100% permanent fiber transport for all three layers. The actual transport depth $D3_1{}^i$ for each needling pass calculated according to Equation 6 appears in the "Actual $D3_1$" column of FIG. 13. The value for $D3_1{}^2$ of 9.37 mm verifies that 100% of the fiber transported from layer 1 (N=3) for needling pass 2 was permanently transported since this value is greater than 9.12 mm (see Table 1).

This process is repeated for each needling pass, examples of which appear in FIGS. 14B and 14C wherein desired transport depths $D1_1$ for needling passes 3 and 4 are determined. There are three layers in the set of layers, and the desired quantity of transport for the lowest layer (N=3) in the set of layers is 70% for the remainder of the needling passes since a uniform CQT of 270 is desired. The desired quantity of 70% for the lowest layer (N=3) was achieved by ensuring that $D3_1$ for each needling pass was between 7.00 and 8.06 mm, as required by Table 1. This was achieved by choosing a desired $D3_1$ of about 7.5 mm at each needling pass. However, this number may be shifted toward the lower limit or the upper limit depending on the transport depth trend evident from FIG. 13. For example, if it appears that the actual $D3_1$ is approaching 8.06 mm for a given needling pass, the desired $D3_1$ for the next needling pass may be shifted toward 7.00 mm (desired $D3_1$<7.5 mm). Likewise, if $D3_1$ is approaching 7.00 mm for a given needling pass, the desired value for the next pass may be shifted toward 8.06 mm (desired $D3_1$>7.5 mm). In such manner, transport depth may be adjusted to remain within the necessary limits to achieve the desired quantity of permanent fiber transport at each needling pass. The quantities of permanent fiber transport at each needling pass may thus be manipulated to achieve a desired CQT for each layer.

Still referring to FIG. 13, note that the actual CQT of 170 for layer 1 is significantly lower than the desired CQT of 270. Achieving the desired CQT for the first layer may be difficult, but is of little consequence since the first layer is usually removed during subsequent processing of the fibrous preform structure. The actual CQT closely tracks the desired CQT for layers 2 through 11. The actual CQT of layers 12 and 13 is low, but may be increased to the desired CQT during addition of subsequent layers, or by subjecting the fibrous structure to walkout needling passes without adding layers.

Variations are possible without departing from the invention. For example, the desired CQT of FIG. 13 was the same for each layer. However, the desired CQT distribution may change from one layer to the next. A fibrous preform structure having any such distribution may be achieved using the principles provided by this disclosure. Further, the projected layer thicknesses for determining $W^i$ and the fiber transport depth $D1_1{}^i$ for each needling pass were based on measurements from the previous needling pass. The projected layer thicknesses may be determined using other techniques, such as deriving them for a given needling pass from curves such as those presented in FIGS. 9 and 10. Similarly, $W^i$ may be determined for a given needling pass by measuring its value during formation of a substantially similar fibrous preform structure in a substantially similar process, or according to any other previously described or equivalent technique.

It is important to note that the effects of needling any given layer actually extend into several lower layers. In FIGS. 11 and 13, the layers through which the Z-fiber bundle actually passes at each needling step are indicated by dashed lines. Fractional entries indicate that fiber was transported through part of a layer during that needling step. Thus, needling of a subsequent layer increases the number of Z-fiber bundles in a lower layer. Increasing CQT for a subsequent layer increases the amount of Z-fibers in a lower previously needled layer.

FIGS. 6, 8, 9, 10, and 11 are based on actual thickness measurements of fibrous layers and fibrous preform structures. A small amount of deviation from one measurement to the next may be evident in those figures and is unavoidable. Measuring fibrous layer thickness and fibrous structure thickness accurately and repeatably is important in the practice of the invention. Measuring thickness according to ASTM D 1777-64 (reapproved 1975), "Standard Method for Measuring Textile Materials", is preferred.

According to a further aspect of the invention, a Z-fiber bundle distribution may also be quantified, and a desired Z-fiber bundle distribution may be achieved. Referring again to FIG. 11, the number of Z-fiber bundles penetrating each fibrous layer may be estimated by totaling the number of needling passes that generate Z-fiber bundles penetrating a given layer. If the number of Z-fiber bundles generated during a single needling pass is constant throughout formation of the fibrous structure, the number of Z-fiber bundles penetrating each fibrous layer may be estimated by totaling the number of entries in a given column, including any fractional entries (due to Z-fiber bundles penetrating only a fraction of a fibrous layer). In FIG. 11, the totals for each fibrous layer are provided in the row entitled "Zn". The number of Z-fiber bundles per layer is then estimated by multiplying Zn by the number of Z-fiber bundles per unit area generated by a single needling pass. For example, assume that one hundred (100) Z-fiber bundles per square centimeter were generated by each needling pass in the FIG. 11 process. The number of Z-fiber bundles per layer are provided in the row entitled ZpL which, in this example, is 100 times Zn for each layer. The number of Z-fiber bundles may also include any Z-fiber bundles already contained within the individual fibrous layers generated during formation of those fibrous layers. For example, fibrous layers 2–31 could already have fifty (50) Z-fiber bundles per square centimeter, which increases the total ZpL by that amount for those layers. As previously discussed, the fibrous layers 2–31 each comprise three unidirectional sub-layers of OPF fiber which are lightly needled together into a coherent layer. Layers 1 and 32 are an airlaid web. Both types of layers already contain a number of Z-fiber bundles.

Referring now to FIG. 15, a cross-sectional view of a fibrous structure 230 is presented according to an aspect of the invention. Fibrous structure 230 comprises a multitude of superposed fibrous layers 201–224. The multitude of fibrous layers 201–224 includes a first or upper group 232 of fibrous layers that has a lower fibrous layer 213 and an upper fibrous layer 224. According to a preferred embodiment, the first group 232 comprises a multitude of fibrous layers. Fibrous structure 230 also comprises a multitude of Z-fiber bundles 240 that pass between fibrous layers within the multitude of fibrous layers 201–224. The Z-fiber bundles 240 are preferably generated by a needling process as superposed fibrous layers are passed beneath a multitude of felting needles, the felting needles being cyclicly driven into the fibrous layers. As used herein, the term "needling density" for a given layer is the number of Z-fiber bundles originating in that layer per unit area. For example, Z-fiber bundles 319 originate in layer 219, and penetrate subjacent layers 216–218. For the sake of clarity, only the Z-fiber bundles generated by a single felting needle are shown in FIG. 15. Any of the previously described needling processes are suitable in the practice of the invention. Each needling pass preferably generates a constant number of Z-fiber bundles per unit area throughout formation of the fibrous structure, the unit area being normal to the Z-fiber bundles within the unit area. This may be accomplished by advancing the fibrous structure beneath the felting needles at a constant speed, and by cyclicly driving the felting needles with a constant speed (punches per second) into the fibrous structure. However, it is important to note that the number of Z-fiber bundles generated per unit area during a given needling pass may be varied throughout formation of the fibrous structure. This may be accomplished by varying the advance speed of the fibrous structure, and/or the cyclic speed of the felting needles. Any such variations are considered to fall within the purview of the invention.

A typical Z-fiber bundle generated by a-needling process is presented in FIG. 16. Z-fiber bundle 319 originates in fibrous layer 219 and penetrates subjacent fibrous layers 216–218. A barbed felting needle (not shown) penetrates fibrous layer 219 first and displaces fibers 252 before withdrawing, thereby generating the Z-fiber bundle 319. The displaced fibers may originate in any of the fibrous layers 216–219. In the example presented, fibers are pulled predominantly from layers 218 and 219. The Z-fiber bundle 319 is only intended to be representative, and other Z-fiber bundles in fibrous layer 230 may penetrate a different number of layers, and displace fibers similar to fibers 252 from more or fewer than two layers, depending on a variety of factors, including the type of fiber and the needling process parameters.

Referring again to FIG. 15, each fibrous layer within the first group 232 has portions 313–324 of the multitude of Z-fiber bundles 240 originating in that fibrous layer and penetrating subjacent fibrous layers without passing through all of the subjacent fibrous layers. Referring to Layer 219, for example, Z-fiber bundles 319 originate in layer 219 and penetrate subjacent fibrous layers 216, 217 and 218 without penetrating subjacent fibrous layers 201–215. A review of all of the fibrous layers 201–224 shows that each fibrous layer has portions of Z-fiber bundles 301–324 originating in that layer and penetrating subjacent fibrous layers. The portions of Z-fiber bundles 313–324 within the first group 232 penetrate an increasing number of fibrous layers from the lower fibrous layer 213 to the upper fibrous layer 224. According to a preferred embodiment, this trend causes the number of Z-fibers per layer to increase within the first group 232 relative to the lower fibrous layer 213. Comparing the sections of fibrous layers 213 and 221 presented in FIG. 15, for example, reveals twenty-two (22) Z-fiber bundles in layer 213 as compared to thirty-six (36) in layer 220. Increasing the number of Z-fiber bundles per layer, as shown, causes Z-fiber bundles from upper layers to reach down and increase the number of Z-fiber bundles in lower previously needled layers. Therefore, according to an aspect of the invention, each fibrous layer 213–224 within the first group 232 has a number of Z-fiber bundles penetrating that fibrous layer, and at least one fibrous layer 216–220 is disposed between the lower fibrous layer 213 and the upper fibrous layer 224 and has a greater total quantity of Z-fiber bundles than the lower fibrous layer 213 due at least in part to the number of fibrous layers increasing from the lower fibrous layer 213 to the upper fibrous layer 224.

Still referring to FIG. 15, the multitude of superposed fibrous layers 201–224 may further include a second or lower group 234 of fibrous layers that has a second lower fibrous layer 207 and a second upper fibrous layer 212. According to a preferred embodiment, the second group 234 is disposed beneath the first group 232. Each fibrous layer within the second group 234 has portions 307–312 of the multitude of Z-fiber bundles 240 originating in that fibrous layer and penetrating subjacent fibrous layers without penetrating all of the subjacent fibrous layers 201–206. The portions of Z-fiber bundles penetrate a decreasing number of fibrous layers from the second lower fibrous layer 207 to the second upper fibrous layer 212. Each fibrous layer 207–212 within the second group 234 has a number of Z-fiber bundles penetrating that fibrous layer, and at least one fibrous layer disposed between fibrous layer 207 and the fibrous layer 212 has a lesser number of Z-fiber bundles than fibrous layer 207 due at least in part to the number of fibrous layers decreasing from the fibrous layer 207 to the second upper fibrous layer 212. For example, fibrous layer 211 has twenty-one (21) Z-fiber bundles and fibrous layer 207 has twenty-nine (29) Z-fiber bundles in the sections of those layers presented in FIG. 15. The number of Z-fiber bundles decreases because the number of fibrous layers penetrated by Z-fiber bundles decreases during subsequent needling passes, and Z-fiber bundles are not transported into lower previously needled layers that would have been transported had the number of layers remained constant or increased.

According to a particularly preferred embodiment, the second group 234 is subjacent the first group 232 and the multitude of fibrous layers 201–224 includes two outer fibrous layers 201 and 224 with several intermediate layers 202–223 disposed between the two outer fibrous layers 201 and 224. Each fibrous layer within the multitude of fibrous layers 201–224 has a number of Z-fiber bundles penetrating that fibrous layer. The number of Z-fiber bundles has a distribution that is greatest within the outer fibrous layers 201 and 224, and least at a point within the intermediate fibrous layers 202–223. The layer-by-layer distribution of the number of Z-fiber bundles per layer may be symmetric about the centerline of the fibrous structure 230, as shown in FIG. 15. A bottom group of fibrous layers 236 has portions 301–306 of the multitude of Z-fiber bundles 240 originating within fibrous layers 201–206. Note that the Z-fiber bundles 301–306 originate in one of layers 201–206, and penetrate all of the subjacent fibrous layers. The number of fibrous layers within group 236 depends on the desired Z-fiber distribution.

Referring now to FIG. 17, a radial section of a brake disk is presented having an annular fibrous structure with two opposing generally planar faces 244 and 246 bounded by an inside circumferential surface 250 and an outside circumferential surface 248. The fibrous structure has a Z-fiber distribution similar to FIG. 15, thus the two outer portions 242 have more Z-fiber bundles than the inner portion 243. The fibrous layers are generally parallel to the outer generally planar faces 244 and 246. A binding matrix permeates the annular fibrous structure. Two outer portions 242 are adjacent planar faces 244 and 246, and an inner portion 243 is disposed between the two outer portions 242. With some fibrous layers, pulling fiber from a layer to create Z-fiber bundles tends to decrease the tensile strength of that layer in the brake disk, normal to the direction of needling. Fibrous layers comprised of generally continuous filaments tend to exhibit these characteristics since needling breaks the continuous fibers into shorter fibers. In fibrous structure 230, tensile strength of such a fibrous layer decreases as the amount of fiber pulled from that layer during needling increases. The Z-fiber bundles in outer portions 242 have greater lengths than the Z-fiber bundles in inner portion 243, which means that more fiber is pulled from outer portions 242 than inner portion 243. Therefore, the two outer portions 242 have a lesser tensile strength, normal to the direction of needling, than the inner portion 243. On the other hand, increasing the number of Z-fiber bundles in a layer tends to increase the resistance of that layer to mechanical wear. Therefore, outer portions 242 have greater resistance to wear than the inner portion 243. Also, increasing the number of Z-fiber bundles passing between layers increases interlaminar shear strength of the brake disk so that outer portions 242 may also have a greater interlaminar shear strength than inner portion 243 (keeping in mind that shear strength may reach a maximum and then decrease as needling increases). Therefore, the through thickness Z-fiber distribution of FIG. 15 provides a functional gradient. The brake disk 238 has the greatest resistance to wear and shear strength in the outer portions 242 adjacent the planar wear surfaces 244 and 246, and the greatest tensile strength in the inner portion 243. The tensile strength and interlaminar shear strength characteristics versus needling are preferably determined empirically for a particular fibrous structure, needling process, and densification method. Finally, the Z-fiber distribution of FIG. 15 may be enhanced by varying the number of Z-fiber bundles per unit area originating within each fibrous layer (needling density), the unit area being normal to the Z-fiber bundles. For example, fibrous layers in groups 232 and 236 could be subjected to a greater needling density than fibrous layers in group 234 which would further amplify the through-thickness Z-fiber gradient distribution. Increasing needling density may be accomplished various ways, including increasing the number of needle punches per unit area during a needling pass, and/or by subjecting a fibrous layer to at least two needling passes without adding additional fibrous material.

Referring now to FIG. 18, a fibrous structure 430 is presented, according to another aspect of the invention. Fibrous structure 430 comprises a multitude of superposed fibrous layers 401–424, a first group of fibrous layers 432, and a second group of fibrous layers 434. Fibrous structure 430 is similar to fibrous structure 230, except that second group 434 (similar to group 234) is an upper group, and first group 432 (similar to group 232) is a lower group disposed beneath the second or upper group 434. The first group 432 has a lower fibrous layer 404 and an upper fibrous layer 412, and preferably comprises a multitude of fibrous layers. Fibrous structure 430 also comprises a multitude of Z-fiber bundles 440 that pass between fibrous layers within the multitude of fibrous layers 401–424. As previously described in relation to FIG. 15, the Z-fiber bundles 440 are preferably generated by a needling process as superposed fibrous layers are passed beneath a multitude of felting needles, the felting needles being cyclicly driven into the fibrous layers. For the sake of clarity, only the Z-fiber bundles generated by a single felting needle are shown in FIG. 18. A bottom group of fibrous layers 436 is provided, similar to group 236 of FIG. 15.

Still referring to FIG. 18, disposing the first group 432 beneath the second group 434 results in a fibrous structure having a different Z-fiber distribution from that depicted in FIG. 15. Each fibrous layer within the multitude of fibrous layers 401–424 has a number of Z-fiber bundles penetrating that fibrous layer. The number of Z-fiber bundles has a distribution that is least within the outer fibrous layers 401 and 424, and greatest at a point within the intermediate fibrous layers 402–423. The layer-by-layer distribution of the number of Z-fiber bundles per layer may be symmetric about the centerline of the fibrous structure 430, as shown in FIG. 19. A symmetric distribution, as depicted in FIGS. 15 and 19, is not necessary in the practice of the invention. In addition, a fibrous structure according to the invention may comprise any number of fibrous layers of constant or varying thickness, and the number of layers penetrated by Z-fiber bundles for each fibrous layer may vary from those presented in FIGS. 15 and 19 resulting in various Z-fiber distributions apparent to those skilled in the art with knowledge of this disclosure. Any such variations are considered to fall within the purview of the invention.

Referring now to FIG. 19, a homogenous fibrous structure 630 is presented, according to an aspect of the invention. Fibrous structure 630 comprises a multitude of superposed fibrous layers 601–620 including a lower fibrous layer 601 and an upper fibrous layer 620. Fibrous layers 601 and 620 may also be referred to as the outermost fibrous layers. A multitude of Z-fiber bundles 640 passes between fibrous layers within the multitude of fibrous layers 601–620. The multitude of superposed fibrous layers 601–602 includes an upper group of fibrous layers 632 and a lower group of fibrous layers 634 subjacent the upper group of fibrous layers 632. The multitude of Z-fiber bundles 640 cohere the multitude of fibrous layers 601–620. Each fibrous layer 606–620 within the upper group of fibrous layers 632 has a portion 706–720 of the multitude of Z-fiber bundles originating in that fibrous layer and passing through a number of fibrous layers disposed beneath that fibrous layer without passing through all of the fibrous layers disposed beneath that fibrous layer. The number of fibrous layers penetrated by the Z-fiber bundles 706–720 is constant in the upper portion 632. Each fibrous layer 601–605 within the lower group 634 of fibrous layers has a portion of the multitude of Z-fiber bundles originating in that fibrous layer and passing through all fibrous layers disposed beneath that fibrous layer.

According to one embodiment, each fibrous layer has a number of Z-fiber bundles penetrating that fibrous layer, and the number of Z-fiber bundles is constant. In fibrous structure 630, for example, each portion of Z-fiber bundles 706–720 originating in the upper group 632 penetrates five adjacent fibrous layers, resulting in each fibrous layer 601–620 having forty-three (43) Z-fiber bundles in the cross-section shown. This is preferably achieved by maintaining a constant needling density with the number of fibrous layers penetrated by Z-fiber bundles in the upper group 632 being constant, and by providing the necessary number of fibrous layers in the lower group 634 to achieve the desired number of Z-fiber bundles in the lower group layers. Note that in FIG. 19 the number of fibrous layers in the lower group 634 corresponds to the number of fibrous layers penetrated by Z-fiber bundles in the upper group 632 (five). The fibrous structure 630 has uniform physical properties throughout the thickness from fibrous layer 601–620. A brake disk manufactured by densifying the fibrous structure 630 has uniform wear, strength and heat transfer characteristics through the thickness of the disk. These characteristics remain constant as the disk wears due to the through-thickness homogeneity.

According to another embodiment, a fibrous structure is provided having Z-fiber bundles that penetrate a constant number of fibrous layers through the fibrous structure, each layer having a number of Z-fiber bundles penetrating that fibrous layer, and the number of Z-fiber bundles is non-constant within the fibrous structure. For example, the outermost fibrous layers could have twice as many Z-fiber bundles than an intermediate layer disposed between the outermost fibrous layers. The number of Z-fiber bundles may be varied by varying the needling density while forming the fibrous structure. A Z-fiber distribution functionally similar to the distribution presented in FIG. 15 may be achieved by decreasing the needling density to a minimum while needling fibrous layers within the inner portion 243. With such a method, a fibrous layer disposed between the outermost fibrous layers has the least number of Z-fiber bundles originating in that fibrous layer. Needling the first layers begins with an initial needling density, decreases to a minimum or least needling density while needling intermediate fibrous layers, and increases to a final needling density while needling final fibrous layers. The initial and final needling densities may be generally equivalent corresponding to a maximum needling density. If needling density varies, the number of Z-fiber bundles per unit area originating within each fibrous layer is non-constant. Thus, a predetermined distribution of Z-fiber bundles may be achieved with the Z-fiber bundles penetrating a constant number of layers in the upper group 632.

According to another aspect of the invention, a process is provided for forming a fibrous structure having a predetermined distribution of Z-fiber bundles by varying Z-fiber bundle length. Fibrous structure 230 of FIG. 15 will be referred to in describing the process, but the process is equally applicable to other fibrous structures having other Z-fiber distributions, and any such variation is considered to fall within the purview of the invention. The process according to the invention comprises the steps of superposing and needling a multitude of fibrous layers 201–224 together in a series of needling passes that generate a multitude of Z-fiber bundles 240 within the multitude of fibrous layers 201–224, each needling pass generating a portion of the multitude of Z-fiber bundles that pass through a number of adjacent fibrous layers, each portion 302–324 of the multitude of Z-fiber bundles 240 penetrating only those adjacent fibrous layers that need more Z-fiber bundles to attain a predetermined number of Z-fiber bundles within each fibrous layer in the multitude of fibrous layers 201–224. For example, assume that the predetermined Z-fiber distribution presented on Table 2 is desired in a fibrous structure, wherein N is the number of Z-fiber bundles per unit area generated during a single needling pass.

TABLE 2

| Layer | Number of Z-Fiber Bundles |
|-------|---------------------------|
| 1–3   | 6*N                       |
| 4–6   | 5*N                       |
| 7–9   | 4*N                       |
| 10–15 | 3*N                       |
| 16–18 | 4*N                       |
| 19–21 | 5*N                       |
| 22–24 | 6*N                       |

A fibrous structure 230 having this Z-fiber distribution may be formed by needling the fibrous layers in a series of needling passes with each needling pass generating a group of Z-fiber bundles in each layer that penetrate the number of layers presented on Table 3. For the purposes of this example, assume that the process begins by needling fibrous layer 201 to at least one lower fibrous layer 200, since at least two fibrous layers are generally required to generate Z-fiber bundles, unless fibrous layer 201 is relatively thick. In addition, fibrous layers 225 and 226 are provided in order to generate Z-fiber bundles in fibrous layers 322–324 at the end of the process.

TABLE 3

| Needling Pass | Number of Fibrous Layers |
|---------------|--------------------------|
| 1             | 2                        |
| 2             | 3                        |
| 3             | 4                        |
| 4             | 5                        |
| 5–8           | 6                        |
| 9–10          | 5                        |
| 11–12         | 4                        |
| 13–18         | 3                        |
| 19–22         | 4                        |

TABLE 3-continued

| Needling Pass | Number of Fibrous Layers |
|---|---|
| 23–25 | 5 |
| 26 | 4 |
| 27 | 5 |
| 28 | 4 |
| 29 | 3 |

Fibrous layers 200 and 225–226 are removed during subsequent processing which leaves fibrous structure 230 having the desired Z-fiber distribution. Removing outer fibrous layers is routine during subsequent CVI/CVD processing. Although it may be desirable to provide the same number of removable layers on both sides of the fibrous structure 230 since the same amount of material is preferably removed from both sides during subsequent processing. An additional fibrous layer is added immediately prior to each needling pass from needling pass 202 to 224. Fibrous layer 225 is subjected to an initial needling pass (needling pass 25) followed by one walkout needling pass wherein the fibrous structure is lowered relative to the multitude of felting needles and again subjected to a needling pass (needling passes 26), and fibrous layer 226 is subjected to an initial needling pass (needling pass 27) followed by two walkout needling passes (needling passes 28 and 29). Needling passes 25 and 26 generate Z-fiber bundles 325, and needling passes 27–29 generate Z-fiber bundles 326. The number of additional fibrous layers and walkout passes depends on the desired Z-fiber distribution in the outer layers. Note that the Z-fiber distribution of Table 2 is symmetric about the midpoint of the fibrous structure, but the number of adjacent fibrous layers for each needling pass is far from symmetric and varies within the multitude of fibrous layers 201–224. Thus, according to a preferred embodiment, the step of superposing and needling the multitude of fibrous layers 201–224 begins with the bottom fibrous layer 200 and proceeds to a top fibrous layer 224 or beyond if additional fibrous layers are provided, such as fibrous layers 225 and 226. A constant number of Z-fiber bundles per unit area is preferably generated during each needling pass. However, the number of Z-fiber bundles generated per unit area may vary throughout formation of the fibrous structure.

The process according to the invention is quite flexible, and may be used to generate many Z-fiber distributions. A fibrous structure having the Z-fiber distribution of the fibrous structure 430 (FIG. 18) presented in Table 4 may be produced by generating Z-fiber bundles during each needling pass as presented in Table 5. For the purposes of this example, assume that the process begins by needling fibrous layer 401 to at least one lower fibrous layer 400, since at least two fibrous layers are generally required to generate Z-fiber bundles, unless fibrous layer 401 is relatively thick. In addition, fibrous layer 425 is provided in order to generate Z-fiber bundles 525 in fibrous layer 424 during needling pass 25 at the end of the process. Fibrous layers 400 and 425 are removed during subsequent processing which leaves fibrous structure 430 having the desired Z-fiber distribution. As with fibrous structure 230, it may be desirable to provide the same number of removable layers on both sides since the same amount of material is preferably removed from both sides of the fibrous structure during subsequent processing. An additional fibrous layer is added immediately prior to each needling pass from needling pass 2 to 24.

TABLE 4

| Layer | Number of Z-Fiber Bundles |
|---|---|
| 201–203 | 3*N |
| 204–206 | 4*N |
| 207–209 | 5*N |
| 210–215 | 6*N |
| 216–218 | 5*N |
| 219–221 | 4*N |
| 222–224 | 3*N |

TABLE 5

| Needling Pass | Number of Fibrous Layers |
|---|---|
| 1 | 2 |
| 2–6 | 3 |
| 7–10 | 4 |
| 11–13 | 5 |
| 14–20 | 6 |
| 21–22 | 5 |
| 23–24 | 4 |
| 25 | 2 |

A fibrous structure having the Z-fiber distribution of the fibrous structure 630 of FIG. 19 may be produced by generating Z-fiber bundles during each needling pass as presented in Table 6. Fibrous structure 630 has a constant number of Z-fiber bundles in each fibrous layer 601–620, which may be quantified as 5*N. For the purposes of this example, assume that the process begins by needling fibrous layer 601 to at least one lower fibrous layer 600, since at least two fibrous layers are generally required to generate Z-fiber bundles, unless fibrous layer 601 is relatively thick. In addition, fibrous layer 621 is provided in order to generate Z-fiber bundles 721 in fibrous layer 620 during needling pass 21 at the end of the process. Fibrous layers 600 and 621 are removed during subsequent processing which leaves fibrous structure 630 having the desired Z-fiber distribution. An additional fibrous layer is added immediately prior to each needling pass from needling pass 2 to 20. The Table 6 values generate a homogenous fibrous structure if needling density is constant. As previously described in relation to FIG. 19, the needling density may be non-constant and varied during the needling process to generate a predetermined Z-fiber distribution.

TABLE 6

| Needling Pass | Number of Fibrous Layers |
|---|---|
| 1 | 2 |
| 2 | 2 |
| 3 | 3 |
| 4 | 4 |
| 5–20 | 5 |
| 21 | 2 |

In the method according to the invention, the multitude of fibrous layers are cohered in a series of needling passes, each needling pass comprising the steps of superposing at least one fibrous layer over fibrous layers previously cohered by previous needling passes. Z-fiber bundles are generated that extend from at least one fibrous layer into the previously cohered fibrous layers, each of the previously cohered fibrous layers receiving Z-fiber bundles during subsequent needling passes until the number of Z-fiber bundles in that fibrous layer reach a predetermined number of Z-fiber bundles for that layer, each fibrous layer in the multitude of fibrous layers thereby having a predetermined number of Z-fiber bundles for that fibrous layer. The Z-fiber bundles generated by at least a portion of the needling passes do not penetrate all the way through the previously needled fibrous layers. As described thus far, the number of adjacent fibrous layers penetrated by the groups of Z-fiber bundles has been expressed as an integer in order to facilitate describing the invention. The number of adjacent layers may also include fractions of fibrous layers as necessary to achieve a desired Z-fiber distribution. In practice, the number of adjacent fibrous layers penetrated by the groups of Z-fiber bundles will generally include fractions of fibrous layers.

The process described in relation to FIGS. 15–19 for forming a fibrous structure with a desired Z-fiber distribution may be used with or without considering compaction and minimum transport, as described in relation to FIGS. 1–14. Considering minimum fiber transport is not necessary if transported fiber has little or no tendency to pull back to the fibrous fiber layer/s from which it originates. Considering compaction of previously needled layers is not necessary if the fibrous layers used in a particular process have little or no tendency to compact during subsequent needling passes. If compaction is a factor, Equation 7 is preferably used to calculate actual transport depth during a given needling pass, and Equation 8 is preferably used to calculate the support setting for the next needling pass. The desired transport depth, $D1_1^i$, in Equation 8 is determined by adding together the layer thicknesses of the number of layers (including a fractional layer if the number includes a fraction of a layer) to be penetrated by Z-fiber bundles in the next needling pass. The individual layer thicknesses may be estimated by any of the methods disclosed in relation to FIGS. 1–14. The process according to the invention may proceed in an actively controlled "predictor-corrector" technique, alternating between Equations 7 and 8, as previously described in relation to FIG. 11.

According to a preferred embodiment, all or some of the fibrous layers are comprised of three unidirectional sub-layers of continuous OPF fiber which are lightly needled together into a coherent layer, as previously described. The needling process utilizes a perforated support, as shown in FIGS. 4A and 4B, and compaction and minimum transport are preferably considered. However, it is important to note that minimum transport, compaction characteristics, and fiber transport characteristics for a given needling process are determined empirically for that process. Such characteristics may be determined according to the principles disclosed herein.

Finally, still referring to the process described in relation to FIGS. 15–19, determining a quantity of fiber transport from each layer, and the set of layers that fiber is transported from, or forming a fibrous structure having a desired CQT for each layer is not necessary. However, quantifying CQT is preferred since it provides an indication of where transported fiber originates, and how much fiber is transported from each layer in the fibrous structure. As previously described, transporting fiber from a fibrous layer affects the mechanical strength of that fibrous layer. Maintaining CQT within a prescribed range in at least a portion of the fibrous structure is preferred. A fibrous structure for a brake disk according to FIG. 15 preferably has a ZpL in the range of 650–750 Z-fiber bundles per square centimeter at the wear surfaces, and a minimum ZpL in the range of about 500–600 close to the centerline (including any Z-fiber bundles already present in each fibrous layer generated during formation of that layer). The CQT for each layer between the wear surfaces is preferably maintained in the range of 200–500, when calculated according to FIG. 11 (preferably using Equation 6a). A fibrous structure for a brake disk according to FIG. 19 may have a generally constant ZpL of about 625 Z-fiber bundles per square centimeter and a CQT in the range 250–350.

The number of Z-fiber bundles per unit area normal to the direction of needling may be varied in a given layer by varying the needling density, by varying transport depth as disclosed herein, and by a combination of varying needling density and transport depth. The invention may be used with any of these approaches, and any such variations are considered to fall within the purview of the invention. Increasing needling density in a process according to the invention may be accomplished various ways, including increasing the number of needle punches per unit area during a needling pass, and/or by subjecting a fibrous layer to at least two needling passes without adding addtional fibrous material.

A gradient Z-fiber distribution for the brake disk 238 of FIG. 17 may be achieved other ways. Such a process may comprise the steps of forming a multitude of Z-fiber bundles passing between fibrous layers within a multitude of superposed fibrous layers in a series of needling passes thereby forming a fibrous structure having two outer portions 242 and an inner portion 243 between the two outer portions 242, each needling pass having a needling density, the needling density being greater when forming the two outer portions 242 than when forming the inner portion A brake disk may be formed from such a fibrous structure by forming a binding matrix permeating the fibrous layers. The two outer portions 242 have more Z-fiber bundles than the inner portion 243. A brake disk made accordingly may have a lesser tensile strength parallel to the surfaces 244 and 246 and greater resistance to wear in the outer portions 242 than in the inner portion 243, as previously described in relation to FIG. 17. The needling density may be increased by subjecting at least one fibrous layer in the outer portions 242 to at least two needling passes before adding additional fibrous material. The needling density may also be changed by changing the number of needle punches per unit area, or by a combination of these two techniques. Any such process may be used in conjunction with any of the processes discussed thus far.

It is evident that many variations are possible without departing from the true scope and spirit of the invention as defined by the claims that follow.

We claim:

1. A fibrous structure, comprising:

a multitude of superposed fibrous layers including an upper group of fibrous layers and lower group of fibrous layers subjacent said upper group of fibrous layers; and, a multitude of Z-fiber bundles cohering said multitude of fibrous layers, each fibrous layer within said upper group of fibrous layers having a portion of said multitude of Z-fiber bundles originating in that fibrous layer and passing through a number of fibrous layers disposed beneath that fibrous layer without passing through all of said fibrous layers disposed beneath that fibrous layer, said number of fibrous layers being constant within said upper group, and each fibrous layer within said lower group of fibrous layers having a portion of said multitude of Z-fiber bundles originating in that fibrous layer and passing through all fibrous layers disposed beneath that fibrous layer.

2. The fibrous structure of claim 1, wherein each fibrous layer has a number of Z-fiber bundles penetrating that fibrous layer, said number of Z-fiber bundles being constant.

3. The fibrous structure of claim 1, wherein each fibrous layer has a number of Z-fiber bundles penetrating that fibrous layer, said number of Z-fiber bundles being non-constant.

4. The fibrous structure of claim 3, wherein a fibrous layer disposed between the outermost said fibrous layers has the least number of Z-fiber bundles originating in that fibrous layer.

5. The fibrous structure of claim 1, wherein the number of Z-fiber bundles per unit area originating within each fibrous layer is constant, said unit area being normal to said Z-fiber bundles within said unit area.

6. The fibrous structure of claim 1, wherein the number of Z-fiber bundles per unit area originating within each fibrous layer is non-constant, said unit area being normal to said Z-fiber bundles within said unit area.

7. The fibrous structure of claim 6, wherein a fibrous layer disposed between the outermost fibrous layers has the least number of Z-fiber bundles per unit area originating in that fibrous layer.

* * * * *